(12) United States Patent
Park

(10) Patent No.: US 12,189,096 B2
(45) Date of Patent: *Jan. 7, 2025

(54) LENS MODULE

(71) Applicant: Samsung Electro-Mechanics Co., Ltd., Suwon-si (KR)

(72) Inventor: Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,783

(22) Filed: Sep. 1, 2023

(65) Prior Publication Data

US 2023/0408798 A1 Dec. 21, 2023

Related U.S. Application Data

(63) Continuation of application No. 17/079,803, filed on Oct. 26, 2020, now Pat. No. 11,782,243, which is a continuation of application No. 16/059,581, filed on Aug. 9, 2018, now Pat. No. 10,852,512, which is a continuation of application No. 14/663,970, filed on Mar. 20, 2015, now Pat. No. 10,073,245.

(30) Foreign Application Priority Data

Oct. 30, 2014 (KR) .................. 10-2014-0149640

(51) Int. Cl.
G02B 13/00 (2006.01)
G02B 9/62 (2006.01)

(52) U.S. Cl.
CPC ............ *G02B 13/0045* (2013.01); *G02B 9/62* (2013.01)

(58) Field of Classification Search
CPC .................................................. G02B 13/0045
USPC .................................................. 359/708, 758
See application file for complete search history.

(56) References Cited

U.S. PATENT DOCUMENTS

| | | |
|---|---|---|
| 8,385,006 B2 | 2/2013 | Tsai et al. |
| 8,599,495 B1 | 12/2013 | Tsai et al. |
| 8,885,268 B2 | 11/2014 | Tang et al. |
| 8,891,177 B2 | 11/2014 | Huang |
| 9,019,626 B2 | 4/2015 | Hsieh et al. |

(Continued)

FOREIGN PATENT DOCUMENTS

| | | |
|---|---|---|
| CN | 202067015 U | 12/2011 |
| CN | 202330843 U | 7/2012 |

(Continued)

OTHER PUBLICATIONS

Korean Office Action issued on Jun. 1, 2016 in counterpart Korean Application No. 10-2014-0149640 (28 pages, with English translation).

(Continued)

*Primary Examiner* — James R Greece
(74) *Attorney, Agent, or Firm* — NSIP Law

(57) ABSTRACT

A lens module includes a first lens having refractive power, a second lens having refractive power, a third lens having refractive power, a fourth lens having refractive power, a fifth lens having refractive power and having a concave object-side surface and a concave image-side surface, and a sixth lens having refractive power and a concave image-side surface. The first to sixth lenses are sequentially disposed from an object side to an image side.

14 Claims, 32 Drawing Sheets

(56) References Cited

U.S. PATENT DOCUMENTS

| | | | |
|---|---|---|---|
| 9,307,130 | B2 | 4/2016 | Chen et al. |
| 9,565,344 | B2 | 2/2017 | Chen et al. |
| 2009/0073577 | A1 | 3/2009 | Jung et al. |
| 2012/0188654 | A1 | 7/2012 | Huang |
| 2012/0243108 | A1 | 9/2012 | Tsai et al. |
| 2013/0016278 | A1 | 1/2013 | Matsusaka et al. |
| 2013/0070346 | A1 | 3/2013 | Hsu et al. |
| 2014/0063626 | A1 | 3/2014 | Huang |
| 2014/0071543 | A1 | 3/2014 | Shinohara |
| 2014/0111872 | A1 | 4/2014 | Tang et al. |
| 2014/0111873 | A1 | 4/2014 | Huang |
| 2014/0111876 | A1 | 4/2014 | Tang et al. |
| 2014/0118844 | A1 | 5/2014 | Tsai et al. |
| 2014/0153117 | A1 | 6/2014 | Hagiwara |
| 2014/0192422 | A1 | 7/2014 | Tang et al. |
| 2014/0320980 | A1 | 10/2014 | Chen |
| 2014/0320981 | A1 | 10/2014 | Hsieh et al. |
| 2014/0355134 | A1* | 12/2014 | Sekine ............... G02B 27/0025 359/713 |
| 2015/0042862 | A1 | 2/2015 | Huang |
| 2015/0116570 | A1 | 4/2015 | Tsai et al. |
| 2015/0153546 | A1 | 6/2015 | Tang et al. |
| 2015/0160435 | A1 | 6/2015 | Chen et al. |
| 2015/0160436 | A1 | 6/2015 | Chen et al. |
| 2015/0192760 | A1 | 7/2015 | Huang |
| 2015/0268447 | A1 | 9/2015 | Huang |
| 2015/0277085 | A1 | 10/2015 | Noda |
| 2015/0316749 | A1 | 11/2015 | Chen |
| 2015/0316750 | A1 | 11/2015 | Dai et al. |
| 2015/0319389 | A1 | 11/2015 | Huang |

FOREIGN PATENT DOCUMENTS

| | | |
|---|---|---|
| CN | 103576296 A | 2/2014 |
| CN | 203606554 U | 5/2014 |
| CN | 103969792 A | 8/2014 |
| CN | 103969805 A | 8/2014 |
| CN | 104122650 A | 10/2014 |
| JP | 2006-163075 A | 6/2006 |
| JP | 2014-092583 A | 5/2014 |
| KR | 10-2008-0069905 A | 7/2008 |
| TW | 201300872 A | 1/2013 |
| TW | 201312154 A1 | 3/2013 |
| TW | 201314257 A1 | 4/2013 |
| TW | 201317620 A1 | 5/2013 |
| TW | 201331663 A1 | 8/2013 |
| TW | 201333575 A | 8/2013 |
| TW | 201344234 A | 11/2013 |
| TW | 201348735 A | 12/2013 |
| TW | 201405162 A | 2/2014 |
| TW | 201413284 A | 4/2014 |
| TW | 201418763 A | 5/2014 |
| TW | 201428338 A | 7/2014 |
| TW | 201432298 A | 8/2014 |
| TW | 201432299 A | 8/2014 |
| TW | I447473 B | 8/2014 |
| TW | 201433811 A | 9/2014 |
| TW | 201433813 A | 9/2014 |
| TW | I457591 B | 10/2014 |
| WO | WO 2014/104787 A1 | 7/2014 |

OTHER PUBLICATIONS

Taiwanese Office Action issued Jan. 23, 2017 in counterpart Taiwanese Patent Application No. 104109869 (21 pages with English translation).

Taiwanese Office Action issued on Jul. 20, 2017 in counterpart Taiwanese Patent Application No. 104109869 (9 pages in English and 8 pages in Chinese).

Taiwanese Office Action issued on Oct. 27, 2017 in counterpart Taiwanese Patent Application No. 104109869 (6pages in English and 5 pages in Chinese).

Chinese Office Action issued on Feb. 27, 2018 in counterpart Chinese Patent Application No. 201510184921.2 (7 pages in English and 6 pages in Chinese).

Taiwanese Office Action issued on Jan. 11, 2019 in counterpart Taiwanese Patent Application No. 107110734 (8 pages in English, 7 pages in Chinese).

Taiwanese Office Action issued on Apr. 23, 2019 in counterpart Taiwanese Patent Application No. 107110734 (7 pages in English, 6 pages in Chinese).

Taiwanese Office Action issued on Nov. 27, 2020 in counterpart Taiwanese Patent Application No. 109119985 (6 pages in English, 6 pages in Mandarin).

Chinese Office Action filed on Mar. 3, 2021 in counterpart Chinese Patent Application No. 201910876429.X (9 pages in English, 7 pages in Chinese).

Taiwanese Office Action issued on Nov. 12, 2021 in corresponding Taiwanese Patent Application No. 110125165 (7 pages in English and 7 pages in Mandarin).

Taiwan Office Action issued on May 16, 2022, in the counterpart Taiwanese Patent Application No. 110125165 (4 pages in English and 4 pages in Taiwanese).

Taiwanese Office Action issued on Aug. 1, 2023, in counterpart Taiwanese Patent Application No. 112101309 (5 pages in English, 6 pages in Chinese).

Taiwanese Office Action Issued on May 8, 2024, in Counterpart Taiwanese Patent Application No. 113108830 (4 Pages in English, 5 Pages in Chinese).

\* cited by examiner

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | OBJECT SIDE |
| Stop | Infinity | -0.250 | | | STOP |
| 2 | 1.57 | 0.550 | 1.547 | 56.1 | FIRST LENS |
| 3 | 30.91 | 0.054 | | | |
| 4 | 5.36 | 0.299 | 1.657 | 21.5 | SECOND LENS |
| 5 | 2.12 | 0.250 | | | |
| 6 | Infinity | 0.000 | | | |
| 7 | 9.56 | 0.594 | 1.547 | 56.1 | THIRD LENS |
| 8 | -25.05 | 0.277 | | | |
| 9 | -2.91 | 0.350 | 1.547 | 56.1 | FOURTH LENS |
| 10 | -2.44 | 0.100 | | | |
| 11 | -100.00 | 0.444 | 1.657 | 21.5 | FIFTH LENS |
| 12 | 7.53 | 0.133 | | | |
| 13 | 1.31 | 0.609 | 1.537 | 55.7 | SIXTH LENS |
| 14 | 1.10 | 0.243 | | | |
| 15 | Infinity | 0.210 | 1.519 | 64.2 | FILTER |
| 16 | Infinity | 0.571 | | | |
| Image | Infinity | 0.000 | | | IMAGE-SENSING SURFACE |

FIG. 3

| FIRST EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.568 | 30.907 | 5.365 | 2.120 | 9.563 | -25.052 | -2.909 | -2.440 | -100.00 | 7.534 | 1.311 | 1.104 |
| CONIC CONSTANT (K) | -0.307 | 0.000 | 0.846 | 3.783 | 21.289 | 0.000 | 5.106 | -38.798 | 68.050 | -17.673 | -3.834 | -0.874 |
| 4-TH ORDER COEFFICIENT (A) | 0.003 | -0.113 | -0.157 | -0.147 | -0.113 | -0.129 | -0.270 | -0.550 | 0.155 | -0.003 | -0.361 | -0.409 |
| 6-TH ORDER COEFFICIENT (B) | 0.033 | 0.464 | 0.589 | 0.287 | 0.087 | 0.136 | 0.667 | 1.269 | -0.193 | 0.068 | 0.276 | 0.265 |
| 8-TH ORDER COEFFICIENT (C) | -0.193 | -1.021 | -1.063 | -0.440 | -0.300 | -0.268 | -0.997 | -2.127 | 0.105 | -0.143 | -0.170 | -0.146 |
| 10-TH ORDER COEFFICIENT (D) | 0.573 | 1.447 | 1.222 | 0.386 | 0.812 | 0.232 | 0.917 | 2.339 | -0.088 | 0.108 | 0.073 | 0.056 |
| 12-TH ORDER COEFFICIENT (E) | -0.974 | -1.547 | -0.975 | -0.189 | -1.297 | -0.011 | -0.360 | -1.567 | 0.085 | -0.044 | -0.019 | -0.014 |
| 14-TH ORDER COEFFICIENT (F) | 0.847 | 1.030 | 0.477 | 0.009 | 1.059 | -0.120 | -0.029 | 0.617 | -0.048 | 0.010 | 0.003 | 0.002 |
| 16-TH ORDER COEFFICIENT (G) | -0.314 | -0.325 | -0.114 | -0.028 | -0.303 | 0.057 | 0.041 | -0.132 | 0.013 | -0.001 | 0.000 | 0.000 |
| 18-TH ORDER COEFFICIENT (H) | 0.000 | 0.000 | 0.000 | 0.000 | 0.000 | 0.000 | 0.000 | 0.012 | -0.001 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 4

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | OBJECT SIDE |
| Stop | Infinity | -0.250 | | | STOP |
| 2 | 1.56 | 0.549 | 1.547 | 56.1 | FIRST LENS |
| 3 | 23.60 | 0.052 | | | |
| 4 | 5.03 | 0.290 | 1.657 | 21.5 | SECOND LENS |
| 5 | 2.10 | 0.257 | | | |
| 6 | Infinity | 0.000 | | | |
| 7 | 15.00 | 0.600 | 1.547 | 56.1 | THIRD LENS |
| 8 | -12.28 | 0.285 | | | |
| 9 | -2.99 | 0.350 | 1.547 | 56.1 | FOURTH LENS |
| 10 | -2.46 | 0.100 | | | |
| 11 | -100.00 | 0.400 | 1.657 | 21.5 | FIFTH LENS |
| 12 | 6.71 | 0.158 | | | |
| 13 | 1.28 | 0.613 | 1.537 | 55.7 | SIXTH LENS |
| 14 | 1.10 | 0.240 | | | |
| 15 | Infinity | 0.210 | 1.519 | 64.2 | FILTER |
| 16 | Infinity | 0.584 | | | |
| Image | Infinity | 0.000 | | | IMAGE-SENSING SURFACE |

FIG. 7

| SECOND EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.563 | 23.600 | 5.029 | 2.099 | 15.000 | -12.281 | -2.994 | -2.458 | -100.00 | 6.714 | 1.283 | 1.098 |
| CONIC CONSTANT (K) | -0.284 | 0.000 | 0.846 | 3.802 | 21.289 | 0.000 | 4.915 | -38.798 | 68.050 | -17.673 | -4.021 | -0.874 |
| 4-TH ORDER COEFFICIENT (A) | 0.006 | -0.112 | -0.151 | -0.135 | -0.099 | -0.129 | -0.296 | -0.512 | 0.214 | 0.006 | -0.358 | -0.410 |
| 6-TH ORDER COEFFICIENT (B) | 0.012 | 0.429 | 0.530 | 0.269 | 0.050 | 0.156 | 0.718 | 1.116 | -0.298 | 0.090 | 0.264 | 0.260 |
| 8-TH ORDER COEFFICIENT (C) | -0.096 | -0.845 | -0.816 | -0.458 | -0.110 | -0.319 | -1.028 | -1.729 | 0.270 | -0.182 | -0.164 | -0.141 |
| 10-TH ORDER COEFFICIENT (D) | 0.329 | 0.895 | 0.521 | 0.500 | 0.163 | 0.381 | 0.942 | 1.713 | -0.279 | 0.132 | 0.073 | 0.052 |
| 12-TH ORDER COEFFICIENT (E) | -0.637 | -0.555 | 0.260 | -0.360 | -0.094 | -0.255 | -0.445 | -1.017 | 0.213 | -0.051 | -0.020 | -0.012 |
| 14-TH ORDER COEFFICIENT (F) | 0.609 | 0.136 | -0.649 | 0.142 | -0.084 | 0.080 | 0.076 | 0.353 | -0.096 | 0.011 | 0.003 | 0.002 |
| 16-TH ORDER COEFFICIENT (G) | -0.245 | -0.012 | 0.288 | -0.089 | 0.140 | -0.007 | 0.004 | -0.067 | 0.023 | -0.001 | 0.000 | 0.000 |
| 18-TH ORDER COEFFICIENT (H) | 0.000 | 0.000 | 0.000 | 0.000 | 0.000 | 0.000 | 0.000 | 0.005 | -0.002 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 8

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | OBJECT SIDE |
| Stop | Infinity | -0.250 | | | STOP |
| 2 | 1.57 | 0.549 | 1.547 | 56.1 | FIRST LENS |
| 3 | 28.15 | 0.055 | | | |
| 4 | 5.29 | 0.291 | 1.657 | 21.5 | SECOND LENS |
| 5 | 2.11 | 0.253 | | | |
| 6 | Infinity | 0.000 | | | |
| 7 | 8.83 | 0.619 | 1.547 | 56.1 | THIRD LENS |
| 8 | -36.77 | 0.266 | | | |
| 9 | -2.97 | 0.350 | 1.547 | 56.1 | FOURTH LENS |
| 10 | -2.44 | 0.100 | | | |
| 11 | -100.00 | 0.439 | 1.657 | 21.5 | FIFTH LENS |
| 12 | 7.63 | 0.133 | | | |
| 13 | 1.32 | 0.614 | 1.537 | 55.7 | SIXTH LENS |
| 14 | 1.11 | 0.243 | | | |
| 15 | Infinity | 0.210 | 1.519 | 64.2 | FILTER |
| 16 | Infinity | 0.571 | | | |
| Image | Infinity | 0.000 | | | IMAGE-SENSING SURFACE |

FIG. 11

| THIRD EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.566 | 28.154 | 5.295 | 2.110 | 8.827 | -36.768 | -2.967 | -2.436 | -100.00 | 7.634 | 1.319 | 1.105 |
| CONIC CONSTANT (K) | -0.306 | 0.000 | 0.846 | 3.769 | 21.289 | 0.000 | 4.982 | -38.798 | 68.050 | -17.673 | -3.891 | -0.873 |
| 4-TH ORDER COEFFICIENT (A) | 0.004 | -0.106 | -0.149 | -0.143 | -0.106 | -0.122 | -0.279 | -0.574 | 0.145 | 0.005 | -0.352 | -0.404 |
| 6-TH ORDER COEFFICIENT (B) | 0.031 | 0.436 | 0.556 | 0.278 | 0.062 | 0.121 | 0.699 | 1.324 | -0.164 | 0.050 | 0.255 | 0.255 |
| 8-TH ORDER COEFFICIENT (C) | -0.180 | -0.973 | -0.993 | -0.455 | -0.200 | -0.200 | -1.026 | -2.170 | 0.063 | -0.123 | -0.152 | -0.138 |
| 10-TH ORDER COEFFICIENT (D) | 0.537 | 1.395 | 1.130 | 0.477 | 0.426 | 0.060 | 0.961 | 2.356 | -0.052 | 0.095 | 0.065 | 0.052 |
| 12-TH ORDER COEFFICIENT (E) | -0.922 | -1.503 | -0.889 | -0.394 | -0.520 | 0.154 | -0.504 | -1.591 | 0.065 | -0.038 | -0.017 | -0.013 |
| 14-TH ORDER COEFFICIENT (F) | 0.810 | 1.003 | 0.432 | 0.214 | 0.214 | -0.208 | 0.100 | 0.647 | -0.041 | 0.009 | 0.003 | 0.002 |
| 16-TH ORDER COEFFICIENT (G) | -0.303 | -0.316 | -0.103 | -0.100 | 0.075 | 0.083 | 0.009 | -0.146 | 0.012 | -0.001 | 0.000 | 0.000 |
| 18-TH ORDER COEFFICIENT (H) | 0.000 | 0.000 | 0.000 | 0.000 | 0.000 | 0.000 | 0.000 | 0.014 | -0.001 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 12

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | OBJECT SIDE |
| Stop | Infinity | -0.250 | | | STOP |
| 2 | 1.57 | 0.548 | 1.547 | 56.1 | FIRST LENS |
| 3 | 26.32 | 0.060 | | | |
| 4 | 5.25 | 0.279 | 1.657 | 21.5 | SECOND LENS |
| 5 | 2.11 | 0.252 | | | |
| 6 | Infinity | 0.000 | | | |
| 7 | 8.12 | 0.602 | 1.547 | 56.1 | THIRD LENS |
| 8 | -48.47 | 0.280 | | | |
| 9 | -2.90 | 0.350 | 1.547 | 56.1 | FOURTH LENS |
| 10 | -2.39 | 0.100 | | | |
| 11 | -50.00 | 0.466 | 1.657 | 21.5 | FIFTH LENS |
| 12 | 7.72 | 0.109 | | | |
| 13 | 1.31 | 0.605 | 1.537 | 55.7 | SIXTH LENS |
| 14 | 1.11 | 0.246 | | | |
| 15 | Infinity | 0.210 | 1.519 | 64.2 | FILTER |
| 16 | Infinity | 0.580 | | | |
| Image | Infinity | 0.000 | | | IMAGE-SENSING SURFACE |

FIG. 15

| FOURTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.565 | 26.320 | 5.245 | 2.113 | 8.124 | -48.468 | -2.904 | -2.392 | -50.000 | 7.717 | 1.306 | 1.109 |
| CONIC CONSTANT (K) | -0.318 | 0.000 | 0.846 | 3.778 | 21.289 | 0.000 | 5.121 | -38.798 | 68.050 | -17.673 | -3.773 | -0.872 |
| 4-TH ORDER COEFFICIENT (A) | 0.000 | -0.100 | -0.153 | -0.152 | -0.114 | -0.134 | -0.287 | -0.582 | 0.164 | 0.022 | -0.346 | -0.399 |
| 6-TH ORDER COEFFICIENT (B) | 0.055 | 0.399 | 0.599 | 0.319 | 0.090 | 0.159 | 0.751 | 1.408 | -0.217 | -0.009 | 0.239 | 0.245 |
| 8-TH ORDER COEFFICIENT (C) | -0.291 | -0.795 | -1.118 | -0.516 | -0.286 | -0.342 | -1.255 | -2.512 | 0.113 | -0.046 | -0.131 | -0.127 |
| 10-TH ORDER COEFFICIENT (D) | 0.814 | 0.955 | 1.421 | 0.577 | 0.753 | 0.396 | 1.456 | 3.033 | -0.047 | 0.042 | 0.052 | 0.046 |
| 12-TH ORDER COEFFICIENT (E) | -1.302 | -0.952 | -1.434 | -0.641 | -1.197 | -0.219 | -0.957 | -2.286 | 0.027 | -0.018 | -0.013 | -0.011 |
| 14-TH ORDER COEFFICIENT (F) | 1.074 | 0.649 | 0.970 | 0.536 | 0.936 | -0.012 | 0.262 | 1.026 | -0.015 | 0.004 | 0.002 | 0.002 |
| 16-TH ORDER COEFFICIENT (G) | -0.377 | -0.219 | -0.301 | -0.255 | -0.252 | 0.039 | -0.006 | -0.251 | 0.005 | 0.000 | 0.000 | 0.000 |
| 18-TH ORDER COEFFICIENT (H) | 0.000 | 0.000 | 0.000 | 0.000 | 0.000 | 0.000 | 0.000 | 0.026 | -0.001 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 16

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | OBJECT SIDE |
| Stop | Infinity | 0.000 | | | STOP |
| 2 | 1.34 | 0.573 | 1.546 | 56.1 | FIRST LENS |
| 3 | 4.65 | 0.097 | | | |
| 4 | 4.09 | 0.260 | 1.656 | 21.5 | SECOND LENS |
| 5 | 2.31 | 0.209 | | | |
| 6 | Infinity | 0.000 | | | |
| 7 | 16.63 | 0.437 | 1.546 | 56.1 | THIRD LENS |
| 8 | -10.75 | 0.336 | | | |
| 9 | -2.71 | 0.350 | 1.656 | 21.5 | FOURTH LENS |
| 10 | -2.41 | 0.109 | | | |
| 11 | -34.57 | 0.448 | 1.656 | 21.5 | FIFTH LENS |
| 12 | 5.35 | 0.132 | | | |
| 13 | 1.29 | 0.505 | 1.536 | 55.7 | SIXTH LENS |
| 14 | 1.14 | 0.206 | | | |
| 15 | Infinity | 0.210 | 1.518 | 64.2 | FILTER |
| 16 | Infinity | 0.575 | | | |
| Image | Infinity | 0.000 | | | IMAGE-SENSING SURFACE |

FIG. 19

| FIFTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.345 | 4.655 | 4.087 | 2.306 | 16.627 | -10.754 | -2.709 | -2.405 | -34.574 | 5.353 | 1.293 | 1.142 |
| CONIC CONSTANT (K) | -0.037 | -11.254 | -12.441 | 5.508 | -1.000 | 8.350 | 4.206 | -28.221 | 62.250 | -18.765 | -5.749 | -0.939 |
| 4-TH ORDER COEFFICIENT (A) | 0.006 | -0.102 | -0.186 | -0.168 | -0.101 | -0.107 | -0.197 | -0.369 | 0.165 | 0.019 | -0.235 | -0.401 |
| 6-TH ORDER COEFFICIENT (B) | 0.009 | 0.170 | 0.281 | 0.165 | 0.045 | 0.152 | 0.582 | 0.861 | -0.222 | -0.046 | 0.070 | 0.244 |
| 8-TH ORDER COEFFICIENT (C) | 0.005 | -0.140 | -0.102 | 0.162 | -0.117 | -0.481 | -1.131 | -1.424 | 0.107 | 0.014 | -0.004 | -0.127 |
| 10-TH ORDER COEFFICIENT (D) | -0.002 | 0.061 | -0.187 | -0.925 | 0.119 | 0.710 | 1.165 | 1.383 | -0.026 | -0.002 | -0.002 | 0.046 |
| 12-TH ORDER COEFFICIENT (E) | 0.007 | -0.014 | 0.255 | 1.545 | -0.049 | -0.581 | -0.596 | -0.736 | 0.004 | 0.000 | 0.000 | -0.010 |
| 14-TH ORDER COEFFICIENT (F) | 0.000 | 0.002 | -0.120 | -1.307 | 0.009 | 0.219 | 0.120 | 0.201 | 0.000 | 0.000 | 0.000 | 0.001 |
| 16-TH ORDER COEFFICIENT (G) | 0.000 | 0.000 | 0.020 | 0.433 | -0.001 | 0.000 | -0.002 | -0.022 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 20

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | OBJECT SIDE |
| Stop | Infinity | 0.000 | | | STOP |
| 2 | 1.34 | 0.576 | 1.546 | 56.1 | FIRST LENS |
| 3 | 4.62 | 0.092 | | | |
| 4 | 4.07 | 0.260 | 1.656 | 21.5 | SECOND LENS |
| 5 | 2.30 | 0.210 | | | |
| 6 | Infinity | 0.000 | | | |
| 7 | 16.71 | 0.437 | 1.546 | 56.1 | THIRD LENS |
| 8 | -10.71 | 0.319 | | | |
| 9 | -2.70 | 0.350 | 1.656 | 21.5 | FOURTH LENS |
| 10 | -2.35 | 0.144 | | | |
| 11 | -25.00 | 0.421 | 1.656 | 21.5 | FIFTH LENS |
| 12 | 5.26 | 0.132 | | | |
| 13 | 1.29 | 0.513 | 1.536 | 55.7 | SIXTH LENS |
| 14 | 1.14 | 0.201 | | | |
| 15 | Infinity | 0.210 | 1.518 | 64.2 | FILTER |
| 16 | Infinity | 0.571 | | | |
| Image | Infinity | 0.000 | | | IMAGE-SENSING SURFACE |

FIG. 23

| SIXTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.342 | 4.618 | 4.066 | 2.300 | 16.706 | -10.711 | -2.699 | -2.349 | -25.000 | 5.256 | 1.293 | 1.142 |
| CONIC CONSTANT (K) | -0.035 | -11.254 | -12.441 | 5.499 | -1.000 | 8.350 | 4.300 | -28.221 | 62.250 | -18.765 | -5.463 | -0.941 |
| 4-TH ORDER COEFFICIENT (A) | 0.007 | -0.109 | -0.190 | -0.167 | -0.101 | -0.108 | -0.186 | -0.382 | 0.159 | 0.021 | -0.247 | -0.399 |
| 6-TH ORDER COEFFICIENT (B) | 0.006 | 0.187 | 0.287 | 0.174 | 0.052 | 0.173 | 0.549 | 0.863 | -0.216 | -0.052 | 0.073 | 0.239 |
| 8-TH ORDER COEFFICIENT (C) | 0.011 | -0.155 | -0.084 | 0.134 | -0.137 | -0.540 | -1.067 | -1.410 | 0.105 | 0.020 | -0.003 | -0.124 |
| 10-TH ORDER COEFFICIENT (D) | -0.008 | 0.068 | -0.240 | -0.872 | 0.137 | 0.797 | 1.119 | 1.382 | -0.026 | -0.004 | -0.002 | 0.044 |
| 12-TH ORDER COEFFICIENT (E) | 0.010 | -0.016 | 0.308 | 1.483 | -0.057 | -0.660 | -0.591 | -0.747 | 0.003 | 0.001 | 0.001 | -0.010 |
| 14-TH ORDER COEFFICIENT (F) | 0.000 | 0.002 | -0.143 | -1.267 | 0.011 | 0.249 | 0.126 | 0.207 | 0.000 | 0.000 | 0.000 | 0.001 |
| 16-TH ORDER COEFFICIENT (G) | 0.000 | 0.000 | 0.024 | 0.423 | -0.001 | 0.000 | -0.004 | -0.023 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 24

| SURFACE NO. | RADIUS OF CURVATURE | THICKNESS/ DISTANCE | REFRACTIVE INDEX | ABBE NUMBER | REMARK |
|---|---|---|---|---|---|
| Object | Infinity | Infinity | | | OBJECT SIDE |
| Stop | Infinity | -0.320 | | | STOP |
| 2 | 1.59 | 0.546 | 1.547 | 56.1 | FIRST LENS |
| 3 | 34.50 | 0.100 | | | |
| 4 | 5.61 | 0.260 | 1.657 | 21.5 | SECOND LENS |
| 5 | 2.14 | 0.227 | | | |
| 6 | Infinity | 0.000 | | | |
| 7 | 10.22 | 0.638 | 1.547 | 56.1 | THIRD LENS |
| 8 | -17.41 | 0.240 | | | |
| 9 | -2.91 | 0.380 | 1.547 | 56.1 | FOURTH LENS |
| 10 | -2.45 | 0.100 | | | |
| 11 | 11.84 | 0.360 | 1.657 | 21.5 | FIFTH LENS |
| 12 | 4.45 | 0.210 | | | |
| 13 | 1.29 | 0.596 | 1.537 | 55.7 | SIXTH LENS |
| 14 | 1.11 | 0.225 | | | |
| 15 | Infinity | 0.210 | 1.519 | 64.2 | FILTER |
| 16 | Infinity | 0.609 | | | |
| Image | Infinity | 0.000 | | | IMAGE-SENSING SURFACE |

FIG. 27

| SEVENTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.593 | 34.499 | 5.611 | 2.140 | 10.217 | -17.412 | -2.906 | -2.455 | 11.836 | 4.450 | 1.292 | 1.110 |
| CONIC CONSTANT (K) | -0.313 | -11.254 | -21.259 | 3.725 | -1.000 | 8.350 | 5.203 | -28.221 | 45.900 | -18.763 | -4.043 | -0.877 |
| 4-TH ORDER COEFFICIENT (A) | 0.003 | -0.058 | -0.102 | -0.152 | -0.101 | -0.181 | -0.408 | -0.510 | 0.190 | 0.057 | -0.334 | -0.407 |
| 6-TH ORDER COEFFICIENT (B) | 0.022 | 0.199 | 0.347 | 0.293 | 0.082 | 0.301 | 1.037 | 1.074 | -0.301 | -0.054 | 0.195 | 0.248 |
| 8-TH ORDER COEFFICIENT (C) | -0.126 | -0.406 | -0.379 | -0.417 | -0.148 | -0.537 | -1.620 | -1.700 | 0.242 | -0.017 | -0.104 | -0.131 |
| 10-TH ORDER COEFFICIENT (D) | 0.374 | 0.465 | -0.258 | 0.226 | 0.171 | 0.575 | 1.802 | 1.852 | -0.171 | 0.029 | 0.045 | 0.048 |
| 12-TH ORDER COEFFICIENT (E) | -0.656 | -0.454 | 1.153 | 0.004 | -0.151 | -0.294 | -1.161 | -1.246 | 0.096 | -0.013 | -0.013 | -0.011 |
| 14-TH ORDER COEFFICIENT (F) | 0.581 | 0.301 | -1.219 | -0.052 | -0.021 | -0.026 | 0.333 | 0.500 | -0.036 | 0.003 | 0.002 | 0.002 |
| 16-TH ORDER COEFFICIENT (G) | -0.222 | -0.108 | 0.453 | -0.032 | 0.095 | 0.052 | -0.019 | -0.111 | 0.007 | 0.000 | 0.000 | 0.000 |
| 18-TH ORDER COEFFICIENT (H) | 0.000 | 0.000 | 0.000 | 0.000 | 0.000 | 0.000 | 0.000 | 0.011 | -0.001 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 28

| SURFACE NO. | RADIUS OF CURVATURE | THICKNESS/ DISTANCE | REFRACTIVE INDEX | ABBE NUMBER | REMARK |
| --- | --- | --- | --- | --- | --- |
| Object | Infinity | Infinity | | | OBJECT SIDE |
| Stop | Infinity | 0.000 | | | STOP |
| 2 | 1.57 | 0.677 | 1.546 | 56.1 | FIRST LENS |
| 3 | 5.23 | 0.112 | | | |
| 4 | 4.69 | 0.250 | 1.645 | 23.3 | SECOND LENS |
| 5 | 2.66 | 0.177 | | | |
| 6 | Infinity | 0.100 | | | |
| 7 | 17.24 | 0.431 | 1.546 | 56.1 | THIRD LENS |
| 8 | -22.59 | 0.380 | | | |
| 9 | -3.44 | 0.380 | 1.645 | 23.3 | FOURTH LENS |
| 10 | -2.86 | 0.342 | | | |
| 11 | -23.85 | 0.539 | 1.645 | 23.3 | FIFTH LENS |
| 12 | 7.45 | 0.120 | | | |
| 13 | 1.85 | 0.744 | 1.536 | 55.7 | SIXTH LENS |
| 14 | 1.59 | 0.271 | | | |
| 15 | Infinity | 0.110 | 1.516 | 54.6 | FILTER |
| 16 | Infinity | 0.626 | | | |
| Image | Infinity | 0.000 | | | IMAGE-SENSING SURFACE |

| EIGHTH EXEMPLARY EMBODIMENT | 2 | 3 | 4 | 5 | 7 | 8 | 9 | 10 | 11 | 12 | 13 | 14 |
|---|---|---|---|---|---|---|---|---|---|---|---|---|
| RADIUS OF CURVATURE | 1.569 | 5.230 | 4.694 | 2.658 | 17.240 | -22.591 | -3.436 | -2.863 | -23.845 | 7.451 | 1.853 | 1.595 |
| CONIC CONSTANT (K) | -0.003 | -11.243 | -12.453 | 5.384 | -1.076 | 8.350 | 4.484 | -22.226 | 62.166 | -19.385 | -5.451 | -0.963 |
| 4-TH ORDER COEFFICIENT (A) | 0.004 | -0.072 | -0.149 | -0.134 | -0.083 | -0.068 | -0.063 | -0.157 | 0.068 | 0.004 | -0.122 | -0.160 |
| 6-TH ORDER COEFFICIENT (B) | 0.002 | 0.096 | 0.208 | 0.151 | 0.027 | 0.042 | 0.144 | 0.230 | -0.061 | -0.013 | 0.029 | 0.056 |
| 8-TH ORDER COEFFICIENT (C) | 0.006 | -0.055 | -0.096 | -0.016 | -0.038 | -0.106 | -0.223 | -0.264 | 0.020 | 0.002 | -0.004 | -0.017 |
| 10-TH ORDER COEFFICIENT (D) | -0.005 | 0.016 | -0.018 | -0.162 | 0.026 | 0.104 | 0.174 | 0.187 | -0.003 | 0.000 | 0.000 | 0.004 |
| 12-TH ORDER COEFFICIENT (E) | 0.003 | -0.003 | 0.035 | 0.209 | -0.008 | -0.053 | -0.067 | -0.073 | 0.000 | 0.000 | 0.000 | -0.001 |
| 14-TH ORDER COEFFICIENT (F) | 0.000 | 0.000 | -0.012 | -0.121 | 0.001 | 0.012 | 0.010 | 0.014 | 0.000 | 0.000 | 0.000 | 0.000 |
| 16-TH ORDER COEFFICIENT (G) | 0.000 | 0.000 | 0.001 | 0.026 | 0.000 | 0.000 | 0.000 | -0.001 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

LENS MODULE

CROSS-REFERENCE TO RELATED APPLICATION

This application is a Continuation Application of U.S. patent application Ser. No. 17/079,803, filed on Oct. 26, 2020, which is a continuation of U.S. patent application Ser. No. 16/059,581, filed on Aug. 9, 2018, now U.S. Pat. No. 10,852,512, issued on Dec. 1, 2020, which is a continuation of U.S. patent application Ser. No. 14/663,970, now U.S. Pat. No. 10,073,245 issued on Sep. 11, 2018, and filed on Mar. 20, 2015, which claims priority to and benefit of Korean Patent Application No. 10-2014-0149640, filed on Oct. 30, 2014, with the Korean Intellectual Property Office, the disclosure of which is incorporated in its entirety herein by reference.

BACKGROUND

Some embodiments of the present disclosure may relate to a lens module having an optical system including six or more lenses.

Lens modules, mounted in camera devices provided in portable terminals, commonly include a plurality of lenses. For example, such a lens module may include six lenses, in order to provide an optical system having high resolution.

However, in the case that such an optical system having high resolution is configured using a plurality of lenses, as described above, a focal length (the distance from an object-side surface of a first lens to an image-sensing surface) of the optical system may be increased. In this case, it may be difficult to mount the lens module in a relatively thin device or portable terminal. Therefore, the development of a lens module in which a length of the optical system is reduced may be needed.

Patent Documents 1 to 3 listed below relate to art associated with the lens module.

RELATED ART DOCUMENT (Patent Document 1) U.S. Patent Application Publication No. 2012/0243108

(Patent Document 2) U.S. Patent Application Publication No. 2014/0111876

(Patent Document 3) U.S. Patent Application Publication No. 2014/0192422

SUMMARY

Some exemplary embodiments in the present disclosure may provide a lens module having high resolution.

According to an aspect of the present disclosure, a lens module may include six lenses including a fifth lens having refractive power and a concave object-side surface and a concave image-side surface and a sixth lens having refractive power and a concave image-side surface.

Other embodiments are also described. The above summary does not include an exhaustive list of all aspects of the present invention. It is contemplated that the invention includes all lens modules that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF DRAWINGS

The above and other aspects, features and other advantages of the present disclosure will be more clearly understood from the following detailed description taken in conjunction with the accompanying drawings, in which:

FIG. 3 is a table illustrating characteristics of lenses illustrated in FIG. 1;

FIG. 4 is a table illustrating aspherical surface coefficients of the lens module illustrated in FIG. 1;

FIG. 7 is a table illustrating characteristics of lenses illustrated in FIG. 5;

FIG. 8 is a table illustrating aspherical surface coefficients of the lens module illustrated in FIG. 5;

FIG. 11 is a table illustrating characteristics of lenses illustrated in FIG. 9;

FIG. 12 is a table illustrating aspherical surface coefficients of the lens module illustrated in FIG. 9;

FIG. 15 is a table illustrating characteristics of lenses illustrated in FIG. 13;

FIG. 16 is a table illustrating aspherical surface coefficients of the lens module illustrated in FIG. 13;

FIG. 19 is a table illustrating characteristics of lenses illustrated in FIG. 17;

FIG. 20 is a table illustrating aspherical surface coefficients of the lens module illustrated in FIG. 17;

FIG. 23 is a table illustrating characteristics of lenses illustrated in FIG. 21;

FIG. 24 is a table illustrating aspherical surface coefficients of the lens module illustrated in FIG. 21;

FIG. 27 is a table illustrating characteristics of lenses illustrated in FIG. 25;

FIG. 28 is a table illustrating aspherical surface coefficients of the lens module illustrated in FIG. 25;

FIG. 31 is a table illustrating characteristics of lenses illustrated in FIG. 29; and FIG. 32 is a table illustrating aspherical surface coefficients of the lens module illustrated in FIG. 29.

DETAILED DESCRIPTION

Figure 1:
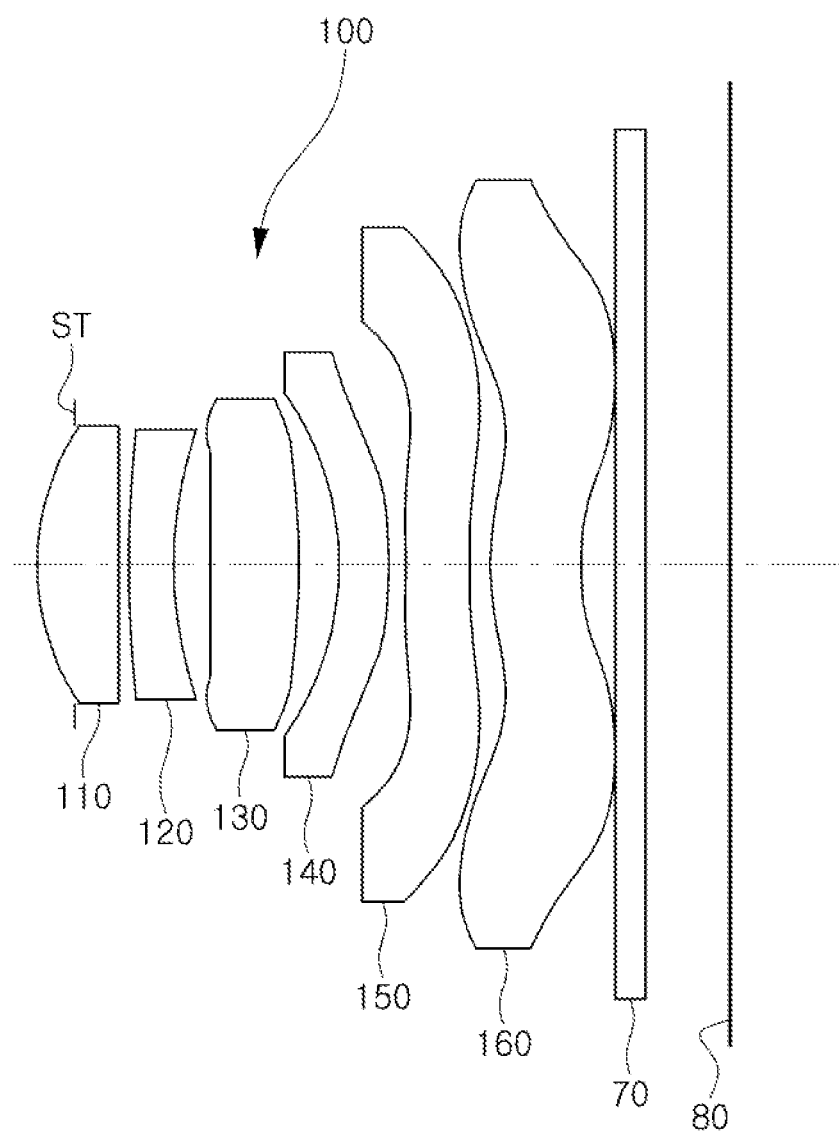
FIG. 1 is a configuration diagram of a lens module according to a first exemplary embodiment of the present disclosure.

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, in embodiments of the present disclosure, a first lens refers to a lens closest to an object (or a subject), and a sixth lens refers to a lens closest to an image-sensing surface (or an image sensor). Further, the term 'first lens surface' or 'first surface' refers to a lens surface oriented to or facing the object (or the subject) in the lens module, and the term 'second lens surface' or 'second surface' refers to a lens surface oriented to or facing the image-sensing surface (or the image sensor) in the lens module. In addition, unless otherwise indicated herein, in embodiments of the present disclosure, units of radii of curvature, thicknesses, OALs (optical axis distances from a first surface of the first lens to the image-sensing surface), SLs, IMGHs (image heights), and BFLs (back focus lengths) of the lenses, an overall focal length of an optical system, and a focal length of each lens may be in millimeters (mm). In addition, unless otherwise indicated herein, thicknesses of lenses, gaps between the lenses, OALs, and SLs may be distances measured based on an optical axis of the lenses. Further, in descriptions of lens shapes, unless otherwise indicated herein, the meaning that one lens surface is convex is that an optical axis portion of a corresponding surface is convex, and the meaning that one lens surface is concave is that an optical axis portion of a corresponding surface is concave. Therefore, although it is described that one lens surface is convex, an edge portion of the lens or a peripheral lens portion of the optical axis may be concave. Likewise, although it is described that one lens surface is concave, an edge portion of the lens or a peripheral lens portion of the optical axis may be convex.

A lens module may include an optical system including a plurality of lenses. For example, the optical system of the lens module may include six or more lenses having refractive power. However, the lens module is not limited to six lenses. The lens module may further include other components or additional one or more lenses. For example, the lens module may include a stop for controlling an amount of light. In addition, the lens module may further include an infrared cut-off filter for removing infrared light. Additionally, the lens module may further include an image sensor (for example, an imaging device) converting an image of a subject incident through the optical system into an electrical signal. Further, the lens module may further include a gap maintaining member adjusting gaps between lenses. In addition to six lenses, one or more lenses may be arranged in front of the first lens, behind the sixth lens, or between the first and sixth lenses.

First to sixth lenses may be formed of materials having a refractive index different from that of air. For example, the first to sixth lenses may be formed using a plastic material or glass. At least one or more of the first to sixth lenses may have an aspherical surface. For example, only the sixth lens of the first to sixth lenses may have the aspherical surface. As another example, respective at least one or both surfaces of all of the first to sixth lenses may be aspherical. Here, the aspherical surface of each lens may be represented by Mathematical Expression 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Mathematical Expression 1]

Here, c is an inverse number of a radius of curvature of a corresponding lens, K is a conic constant, and r is a distance from any point on an aspherical surface to an optical axis. In addition, constants A to J refer to sequential 4-th order to 20-th order aspherical coefficients. In addition, Z indicates sag at any point on an aspherical surface positioned to be spaced apart from the optical axis by a distance r.

The optical system configuring the lens module may have an F No. of 2.3 or less. In this case, the subject may be clearly imaged. For example, the lens module according to the exemplary embodiment of the present disclosure may clearly capture an image of the subject even under conditions of low illumination (for example, 100 lux or less). However, F No. of the optical system may be greater than 2.3.

The optical system of the lens module may satisfy the following Conditional Expression.

$$0.5 < f1/f < 0.9$$ [Conditional Expression]

Here, f is an overall focal length [mm] of the lens module, and f1 is a focal length [mm] of the first lens. The Conditional Expression above is a numerical condition for optimizing refractive power of the first lens. For example, the first lens that is outside of the lower value limit may have relatively strong refractive power to limit optical designs of the second to fifth lenses, and the first lens that is outside of the upper value limit may have relatively weak refractive power, which may be disadvantageous in miniaturizing the lens module.

In addition, f1/f may be outside of the lower value limit of the Conditional Expression above, but refractive power of the first lens may be increased, such that it may be difficult to correct spherical aberration. f1/f may be outside of the upper value limit of the Conditional Expression above, but correction of aberration may be easily performed and a length of the optical system may be increased.

The optical system of the lens module may satisfy the following Conditional Expressions.

$$20 < V1-V2 < 45$$ [Conditional Expression]

$$1 |V1-V3| < 15$$ [Conditional Expression]

$$25 < V1-V5 < 45$$ [Conditional Expression]

Here, V1 is an Abbe number of the first lens, V2 is an Abbe number of the second lens, V3 is an Abbe number of the third lens, and V5 is an Abbe number of the fifth lens.

The Conditional Expressions above may be limitations of lens materials for reducing aberration. For example, the first lens may be formed of a material selected among materials having an Abbe number that is larger than those of the second and fifth lenses and is substantially similar to that of the third lens.

In addition, the Conditional Expressions above may be preferred conditions for significantly decreasing chromatic aberration.

The second to fifth lenses of the optical system configuring the lens module may satisfy the following Conditional Expressions.

$-5.0 < f2/f < 0$ [Conditional Expression]

$0 < f3/f < 6.0$ [Conditional Expression]

$2.0 < f4/f$ [Conditional Expression]

$f5/f < -1.0$ [Conditional Expression]

Here, f2 is a focal length [mm] of the second lens, f3 is a focal length [mm] of the third lens, f4 is a focal length [mm] of the fourth lens, f5 is a focal length [mm] of the fifth lens, and f is the overall focal length [mm] of the lens module.

The Conditional Expressions above may provide refractive power ranges of the second to fifth lenses, in which a length of the optical system may be shortened. In addition, the Conditional Expressions above may be optimal conditions for correcting aberration.

The optical system of the lens module may satisfy the following Conditional Expression.

$OAL/f < 1.5$ [Conditional Expression]

Here, OAL is a distance [mm] from an object-side surface of the first lens to an image-sensing surface, and f is the overall focal length [mm] of the lens module. The Conditional Expression above may be a preferred condition for miniaturizing the lens module.

The first to third lenses of the optical system configuring the lens module may satisfy the following Conditional Expressions.

$1.4 < f1/f2 < 5.0$ [Conditional Expression]

$f2/f3 < 0.8$ [Conditional Expression]

Here, f1 is the focal length [mm] of the first lens, and f2 is the focal length [mm] of the second lens, and f3 is the focal length [mm] of the third lens.

The Conditional Expressions above may be conditions for optimizing optical designs of the first to third lenses. For example, when the second lens is designed in a range in which at least one or all of the Conditional Expressions above are satisfied, degrees of freedom of the first and third lenses may be increased. For example, the first and third lenses may be variously modified or implemented. In addition, the Conditional Expressions above may be preferred conditions for improving aberration characteristics and securing optical performance.

The optical system of the lens module may satisfy the following Conditional Expressions.

$BFL/f < 0.5$ [Conditional Expression]

$D3/f < 0.1$ [Conditional Expression]

$0 < r3/f < 10.0$ [Conditional Expression]

$0 < r11/f < 5.0$ [Conditional Expression]

Here, BFL is a distance [mm] from an image-side surface of the sixth lens to the image-sensing surface, D3 is an optical axis distance from an image-side surface of the first lens to an object-side surface of the second lens, r3 is a radius [mm] of curvature of the image-side surface of the first lens, r11 is a radius [mm] of curvature of an image-side surface of the fifth lens, and f is the overall focal length [mm] of the lens module.

The Conditional Expressions above may be conditions for optimizing sizes of BFL, D3, r3, and r11 having an influence on the overall focal length of the optical system. For example, the Conditional Expression for BFL above may be a preferred condition for miniaturizing the lens module. As another example, the Conditional Expression for D3 above may be a preferred condition for improving longitudinal chromatic aberration characteristics. As yet another example, the Conditional Expressions for r3 above and r11 may be preferred conditions for securing refractive power of the first and fifth lenses.

The optical system of the lens module may satisfy the following Conditional Expression.

$1.0 < EPD/2/f12$ [Conditional Expression]

Here, EPD is an entrance pupil diameter (EPD) [mm], and f12 is a synthetic focal length [mm] of the first and second lenses. The Conditional Expression above may be a preferred condition for securing an amount of light. However, EPD/2 may be outside of a range of the Conditional Expression above, but a sufficient amount of light may not be secured, such that it may be difficult to implement relatively high resolution.

Next, the optical system configuring the lens module will hereinafter be described.

The optical system of the lens module may be manufactured in the following manner.

For example, the optical system of the lens module may include a first lens having refractive power, a second lens having refractive power, a third lens having refractive power, a fourth lens having refractive power, a fifth lens having refractive power, an object-side surface thereof being concave and an image-side surface thereof being concave, and a sixth lens having refractive power and having an image-side surface thereof being concave.

As another example, the optical system of the lens module may include a first lens having positive refractive power, a second lens having refractive power and an object-side surface thereof being convex, a third lens having positive refractive power, a fourth lens having positive refractive power, a fifth lens having refractive power and having an image-side surface thereof being concave, and a sixth lens having positive refractive power.

As yet another example, the optical system of the lens module may include a first lens having positive refractive power, a second lens having refractive power and an object-side surface thereof being convex, a third lens having positive refractive power and an image-side surface thereof being convex, a fourth lens having positive refractive power, a fifth lens having refractive power and an image-side surface thereof being concave, and a sixth lens having positive refractive power.

The lenses and an image sensor configuring the optical system will hereinafter be described.

The first lens may have refractive power. For example, the first lens may have positive refractive power. However, the first lens may have negative refractive power.

The first lens may be convex toward an object. For example, the first lens may have a first surface (object-side surface) that is convex and a second surface (image-side surface) that is concave. However, the first lens may be concave toward the object.

The first lens may have at least one aspherical surface. For example, both surfaces of the first lens may be aspherical. The first lens may be formed of a material having relatively high light transmissivity and/or excellent workability. For example, the first lens may be formed using a plastic material. However, a material of the first lens is not limited to plastic. For example, the first lens may be formed using glass.

The second lens may have refractive power. For example, the second lens may have negative refractive power. However, the second lens may have positive refractive power.

The second lens may be convex toward the object. For example, the second lens may have a first surface that is convex and a second surface that is concave. However, the second lens may be concave toward the object.

The second lens may have at least one aspherical surface. For example, both surfaces of the second lens may be aspherical. The second lens may be formed of a material having relatively high light transmissivity and/or excellent workability. For example, the second lens may be formed using a plastic material. However, a material of the second lens is not limited to plastic. For example, the second lens may be formed using glass. The second lens may be formed of a material having a high refractive index. For example, the second lens may be formed of a material having a refractive index of 1.60 or more (in this case, the second lens may have an Abbe number of 30 or less). The second lens formed of this material may easily refract light, even in a small curvature shape. Therefore, the second lens formed of this material may be easily manufactured and may lower a defect rate with regard to manufacturing tolerance. In addition, the second lens formed of this material may allow a distance between lenses to be decreased, such that the lens module may be miniaturized.

The third lens may have refractive power. For example, the third lens may have positive refractive power. However, the third lens may have negative refractive power.

The third lens may have biconvex surfaces or both surfaces that are convex. For example, the third lens may have a first surface that is convex and a second surface that is convex. However, the third lens may have at least one concave surface.

The third lens may have at least one aspherical surface. For example, both surfaces of the third lens may be aspherical. The third lens may be formed of a material having relatively high light transmissivity and/or excellent workability. For example, the third lens may be formed using a plastic material. However, a material of the third lens is not limited to plastic. For example, the third lens may be formed using glass.

The fourth lens may have refractive power. For example, the fourth lens may have positive refractive power. However, the fourth lens may have negative refractive power.

The fourth lens may have a meniscus shape which is convex toward the image. For example, the fourth lens may have a first surface that is concave and a second surface that is convex.

The fourth lens may have at least one aspherical surface. For example, both surfaces of the fourth lens may be aspherical. The fourth lens may be formed of a material having high light transmissivity and/or excellent workability. For example, the fourth lens may be formed using a plastic material. However, a material of the fourth lens is not limited to plastic. For example, the fourth lens may be formed using glass.

The fifth lens may have refractive power. For example, the fifth lens may have negative refractive power. However, the fifth lens may have positive refractive power.

The fifth lens may have one or more surfaces that are concave. For example, the fifth lens may have a concave image-side surface. As another example, the fifth lens may have both surfaces that are concave.

The fifth lens may have at least one aspherical surface. For example, both surfaces of the fifth lens may be aspherical. The fifth lens may be formed of a material having relatively high light transmissivity and/or excellent workability. For example, the fifth lens may be formed using a plastic material. However, a material of the fifth lens is not limited to plastic. For example, the fifth lens may be formed using glass.

In addition, the fifth lens may be formed of a material having a relatively high refractive index. For example, the fifth lens may be formed of a material having a refractive index of 1.60 or more (in this case, the fifth lens may have an Abbe number of or less). The fifth lens formed of this material may easily refract light even in a relatively small curvature shape. Therefore, the fifth lens formed of this material may be easily manufactured and may lower a defect rate with regard to manufacturing tolerance. In addition, the fifth lens formed of this material may allow a distance between lenses to be decreased, such that the lens module may be miniaturized.

The fifth lens may satisfy the following Conditional Expression. The fifth lens satisfying the following Conditional Expression may be easily manufactured.

$$0.4 < (r10 - r11)/(r10 + r11) < 2.0 \quad \text{[Conditional Expression]}$$

Here, r10 is a radius of curvature of an object-side surface of the fifth lens, and r11 is a radius of curvature of an image-side surface of the fifth lens.

The sixth lens may have refractive power. For example, the sixth lens may have positive refractive power. However, the sixth lens may have negative refractive power.

The sixth lens may have a meniscus shape which is convex toward the object. For example, the sixth lens may have a first surface that is convex and a second surface that is concave.

The sixth lens may have at least one aspherical surface. For example, both surfaces of the sixth lens may be aspherical. In addition, the sixth lens may be formed to include at least one or more inflection points on one or both surfaces thereof. For example, the first surface of the sixth lens may be convex on an optical axis, and be concave in the vicinity of the optical axis. Additionally, the first surface of the sixth lens may be convex at an edge thereof. The second surface of the sixth lens may be concave on an optical axis and become convex toward an edge thereof. The second surface of the sixth lens may be convex toward the image at the periphery. The sixth lens may be formed of a material having relatively high light transmissivity and/or excellent workability. For example, the sixth lens may be formed using a plastic material. However, a material of the sixth lens is not limited to plastic. For example, the sixth lens may be formed using glass.

The image sensor may be configured to implement high resolution of, for example, but not limited to, 1300 or more megapixels. For example, a unit size of the pixels configuring the image sensor may be 1.12 μm or less.

The optical system of the lens module may be configured so that effective diameters of the lenses become smaller from the first lens toward the second lens and/or be increased from the third lens toward the sixth lens. The optical system configured as described above may increase an amount of light incident to the image sensor to increase resolution of the lens module.

The optical system of the lens module may be configured to have a low F No. For example, the optical system of the lens module may have F No. of 2.3 or less. The optical system of the lens module may be configured to have a relatively short length (OAL). For example, OAL of the lens module may be 5.3 [mm] or less.

The lens module configured as described above may reduce aberration causing image quality deterioration. In addition, the lens module of embodiments of the present disclosure may implement relatively high resolution. Further, the lens module configured as described above may be easily lightened and may reduce manufacturing costs.

A lens module according to a first exemplary embodiment of the present disclosure will hereinafter be described with reference to FIG. 1.

A lens module 100 may include an optical system including a first lens 110, a second lens 120, a third lens 130, a fourth lens 140, a fifth lens 150, and a sixth lens 160. In addition, the lens module 100 may further include an infrared cut-off filter 70 and an image sensor 80. Further, the lens module 100 may further include at least one stop (ST). For example, the stop ST may be disposed between a subject (object) and the first lens 110. However, the stop ST may be disposed anywhere between the first lens 110 and the sixth lens 160.

In the exemplary embodiment of the present disclosure, the first lens 110 may have positive refractive power. However, the first lens 110 may have negative refractive power. An object-side surface of the first lens 110 may be convex and/or an image-side surface of the first lens 110 may be concave. The second lens 120 may have negative refractive power. However, the second lens 120 may have positive refractive power. An object-side surface of the second lens 120 may be convex and/or an image-side surface of the second lens 120 may be concave. The third lens 130 may have positive refractive power. However, the third lens 130 may have negative refractive power. An object-side surface of the third lens 130 may be convex and/or an image-side surface of the third lens 130 may be convex. The fourth lens 140 may have positive refractive power. However, the fourth lens 140 may have negative refractive power. An object-side surface of the fourth lens 140 may be concave and/or an image-side surface of the fourth lens 140 may be convex. The fifth lens 150 may have negative refractive power. However, the fifth lens 150 may have positive refractive power. The fifth lens 150 may have an object-side surface that is concave and/or an image-side surface that is concave. The sixth lens 160 may have positive refractive power. However, the sixth lens 160 may have negative refractive power. An object-side surface of the sixth lens 160 may be convex and/or an image-side surface of the sixth lens 160 may be concave. In addition, one or more inflection points may be formed on at least one or each of the object-side surface and the image-side surface of the sixth lens 160.

In the exemplary embodiment of the present disclosure, at least one or all of the first lens 110, the third lens 130, the fourth lens 140, and the sixth lens 160 may have positive refractive power. Among these lenses, the first lens 110 may have the strongest refractive power, and the sixth lens 160 may have the weakest refractive power.

In the exemplary embodiment of the present disclosure, one or both of the second lens 120 and the fifth lens 150 may have negative refractive power. Here, the fifth lens 150 may have refractive power stronger than that of the second lens 120.

Figure 2:
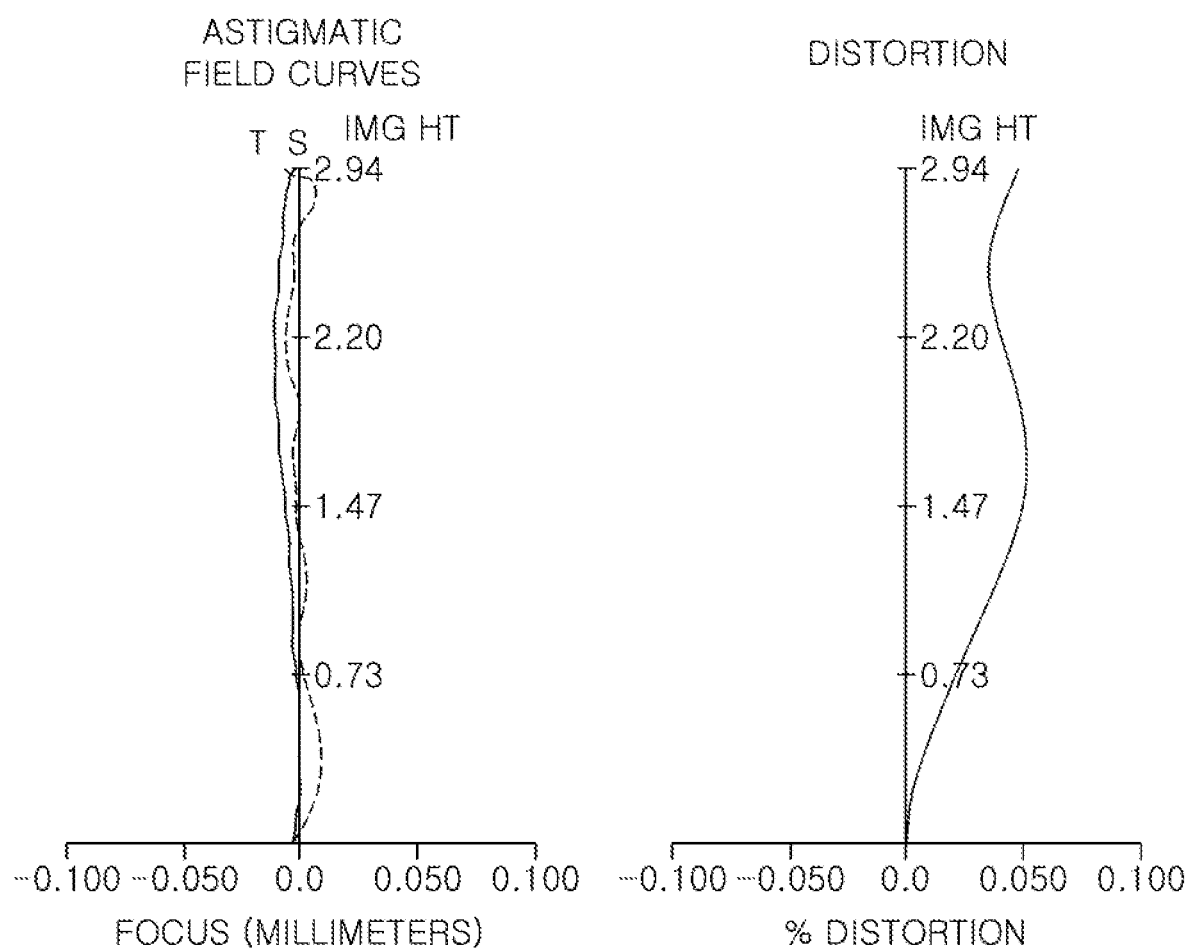
FIG. 2 is curves illustrating aberration characteristics of the lens module illustrated in FIG. 1.

FIG. 2 is a graph illustrating aberration characteristics of the lens module 100 of the first exemplary embodiment.

Characteristics of the optical system configuring the lens module 100 will hereinafter be described with reference to FIG. 3.

In FIG. 3, Surface Nos. 2 and 3 indicate the first and second surfaces of the first lens 110, respectively, and Surface Nos. 4 and 5 indicate the first and second surfaces of the second lens 120, respectively. In a similar scheme, Surface Nos. 7 to 14 indicate first and second surfaces of the third to sixth lenses 130 to 160, respectively. In addition, Surface Nos. 15 and 16 indicate first and second surfaces of the infrared cut-off filter 70, respectively.

Aspherical values of the optical system configuring the lens module 100 of the first exemplary embodiment will hereinafter be described with reference to FIG. 4.

In FIG. 4, a horizontal axis of the table refers to Surface Nos. of the first to sixth lenses 110 to 160, and a vertical axis of the table refers to characteristics corresponding to each surface of the lenses.

Figure 5:
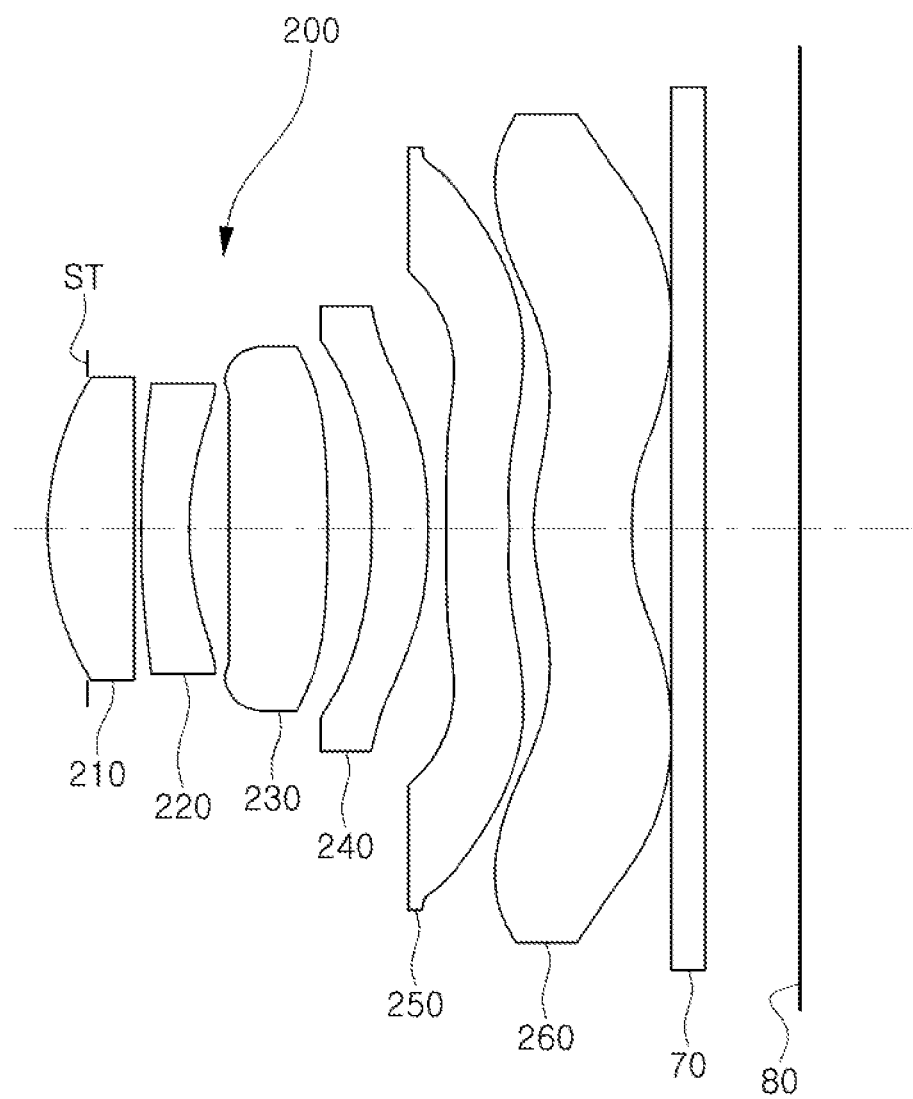
FIG. 5 is a configuration diagram of a lens module according to a second exemplary embodiment of the present disclosure.

A lens module according to a second exemplary embodiment of the present disclosure will hereinafter be described with reference to FIG. 5.

A lens module 200 may include an optical system including a first lens 210, a second lens 220, a third lens 230, a fourth lens 240, a fifth lens 250, and a sixth lens 260. In addition, the lens module 200 may further include an infrared cut-off filter 70 and an image sensor 80. Further, the lens module 200 may further include at least one stop (ST). For example, the stop ST may be disposed between a subject (object) and the first lens 210. However, the stop ST may be disposed anywhere between the first lens 210 and the sixth lens 260.

In the exemplary embodiment of the present disclosure, the first lens 210 may have positive refractive power. However, the first lens 210 may have negative refractive power. An object-side surface of the first lens 210 may be convex and/or an image-side surface of the first lens 210 may be concave. The second lens 220 may have negative refractive power. However, the second lens 220 may have positive refractive power. An object-side surface of the second lens 220 may be convex and/or an image-side surface of the second lens 220 may be concave. The third lens 230 may have positive refractive power. However, the third lens 230 may have negative refractive power. An object-side surface of the third lens 230 may be convex and/or an image-side surface of the third lens 230 may be convex. The fourth lens 240 may have positive refractive power. However, the fourth lens 240 may have negative refractive power. An object-side surface of the fourth lens 240 may be concave and/or an image-side surface of the fourth lens 240 may be convex. The fifth lens 250 may have negative refractive power. However, the fifth lens 250 may have positive refractive power. The fifth lens 250 may have an object-side surface that is concave and/or an image-side surface that is concave. The sixth lens 260 may have positive refractive power. However, the sixth lens 260 may have negative refractive power. An object-side surface of the sixth lens 260 may be convex and/or an image-side surface of the sixth lens 260 may be concave. In addition, one or more inflection points may be formed on at least one or each of the object-side surface and the image-side surface of the sixth lens 260.

In the exemplary embodiment of the present disclosure, at least one or all of the first lens 210, the third lens 230, the fourth lens 240, and the sixth lens 260 may have positive refractive power. Among these lenses, the first lens 210 may have the strongest refractive power, and the sixth lens 260 may have the weakest refractive power.

In the exemplary embodiment of the present disclosure, one or both of the second lens 220 and the fifth lens 250 may have negative refractive power. Here, the fifth lens 250 may have refractive power stronger than that of the second lens 220.

Figure 6:
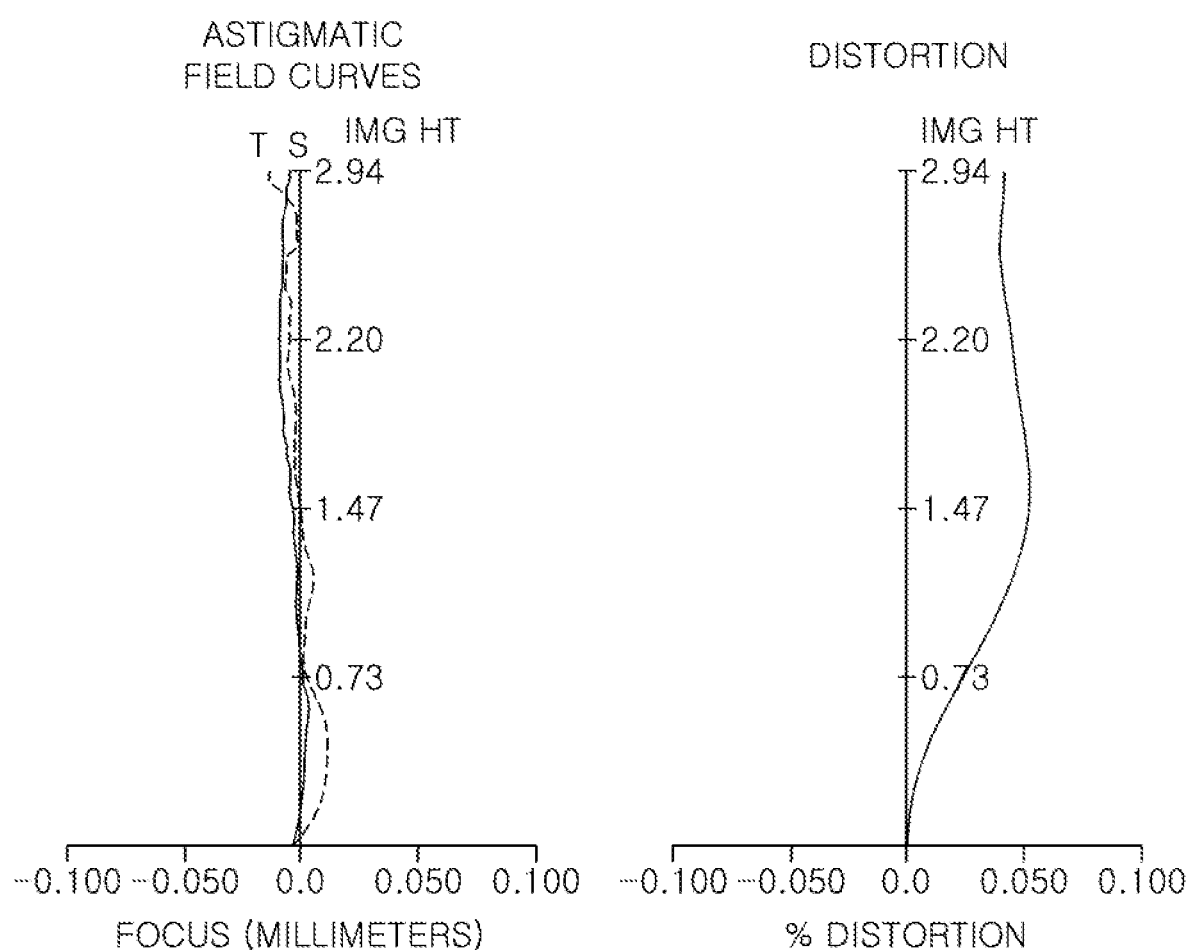
FIG. 6 is curves illustrating aberration characteristics of the lens module illustrated in FIG. 5.

FIG. 6 is a graph illustrating aberration characteristics of the lens module 200 of the second exemplary embodiment.

Characteristics of the optical system configuring the lens module 200 will hereinafter be described with reference to FIG. 7.

In FIG. 7, Surface Nos. 2 and 3 indicate the first and second surfaces of the first lens 210, respectively, and Surface Nos. 4 and 5 indicate the first and second surfaces of the second lens 220, respectively. In a similar scheme, Surface Nos. 7 to 14 indicate first and second surfaces of the third to sixth lenses 230 to 260, respectively. Meanwhile, Surface No. 6 indicates the stop ST, and Surface Nos. 15 and 16 indicate first and second surfaces of the infrared cut-off filter 70, respectively.

Aspherical values of the optical system configuring the lens module 200 of the second exemplary embodiment will hereinafter be described with reference to FIG. 8.

In FIG. 8, a horizontal axis of the table refers to Surface Nos. of the first to sixth lenses 210 to 260, and a vertical axis of the table refers to characteristics corresponding to each lens surface.

Figure 9:
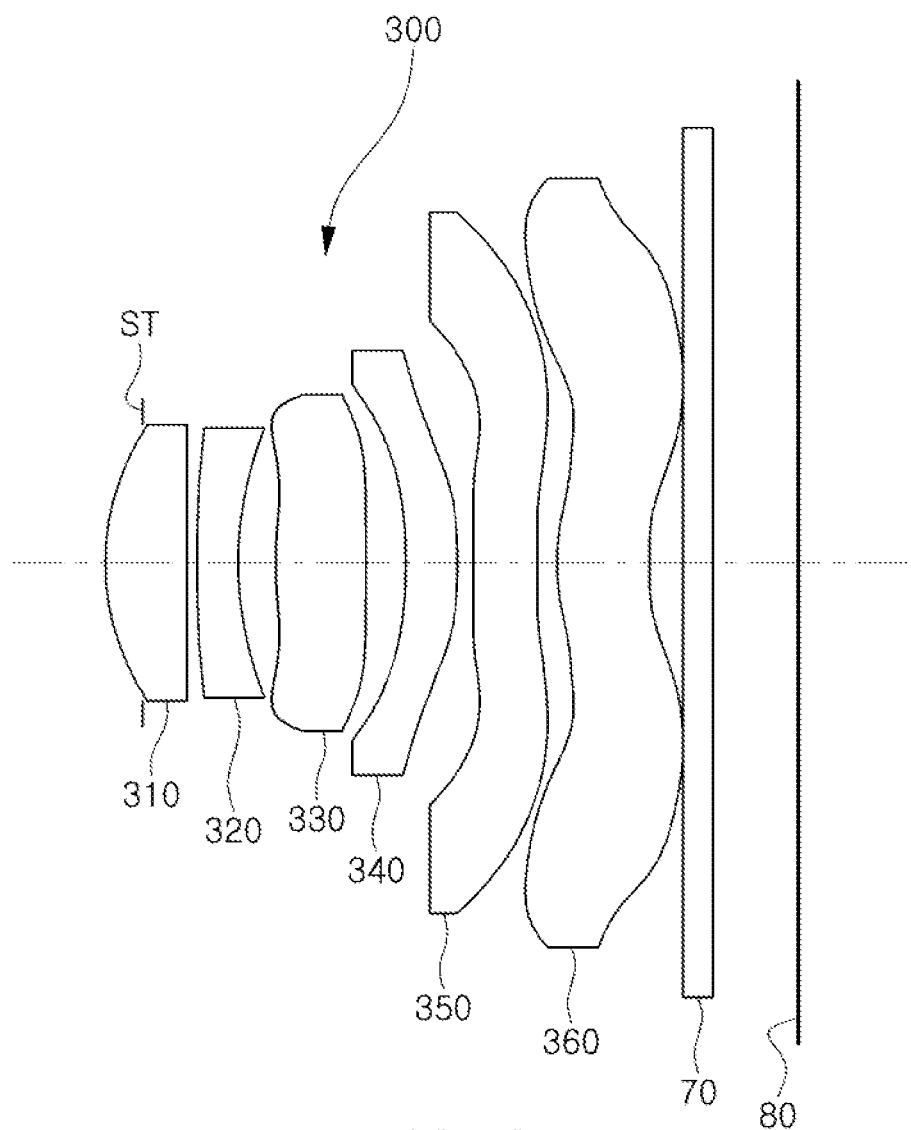
FIG. 9 is a configuration diagram of a lens module according to a third exemplary embodiment of the present disclosure.

A lens module according to a third exemplary embodiment of the present disclosure will hereinafter be described with reference to FIG. 9.

A lens module 300 may include an optical system including a first lens 310, a second lens 320, a third lens 330, a fourth lens 340, a fifth lens 350, and a sixth lens 360. In addition, the lens module 300 may further include an infrared cut-off filter 70 and an image sensor 80. Further, the lens module 300 may further include at least one stop (ST). For example, the stop ST may be disposed between a subject (object) and the first lens 310. However, the stop ST may be disposed anywhere between the first lens 310 and the sixth lens 360.

In the exemplary embodiment of the present disclosure, the first lens 310 may have positive refractive power. However, the first lens 310 may have negative refractive power. An object-side surface of the first lens 310 may be convex and/or an image-side surface of the first lens 310 may be concave. The second lens 320 may have negative refractive power. However, the second lens 320 may have positive refractive power. An object-side surface of the second lens 320 may be convex and/or an image-side surface of the second lens 320 may be concave. The third lens 330 may have positive refractive power. However, the third lens 330 may have negative refractive power. An object-side surface of the third lens 330 may be convex and/or an image-side surface of the third lens 330 may be convex. The fourth lens 340 may have positive refractive power. However, the fourth lens 340 may have negative refractive power. An object-side surface of the fourth lens 340 may be concave and/or an image-side surface of the fourth lens 340 may be convex. The fifth lens 350 may have negative refractive power. However, the fifth lens 350 may have positive refractive power. The fifth lens 350 may have an object-side surface that is concave and/or an image-side surface that is concave. The sixth lens 360 may have positive refractive power. However, the sixth lens 360 may have negative refractive power. An object-side surface of the sixth lens 360 may be convex and/or an image-side surface of the sixth lens 360 may be concave. In addition, one or more inflection points may be formed on at least one or each of the object-side surface and the image-side surface of the sixth lens 360.

In the exemplary embodiment of the present disclosure, at least one or all of the first lens 310, the third lens 330, the fourth lens 340, and the sixth lens 360 may have positive refractive power. Among these lenses, the first lens 310 may have the strongest refractive power, and the sixth lens 360 may have the weakest refractive power.

In the exemplary embodiment of the present disclosure, one or both of the second lens 320 and the fifth lens 350 may have negative refractive power. Here, the fifth lens 350 may have refractive power stronger than that of the second lens 320.

Figure 10:
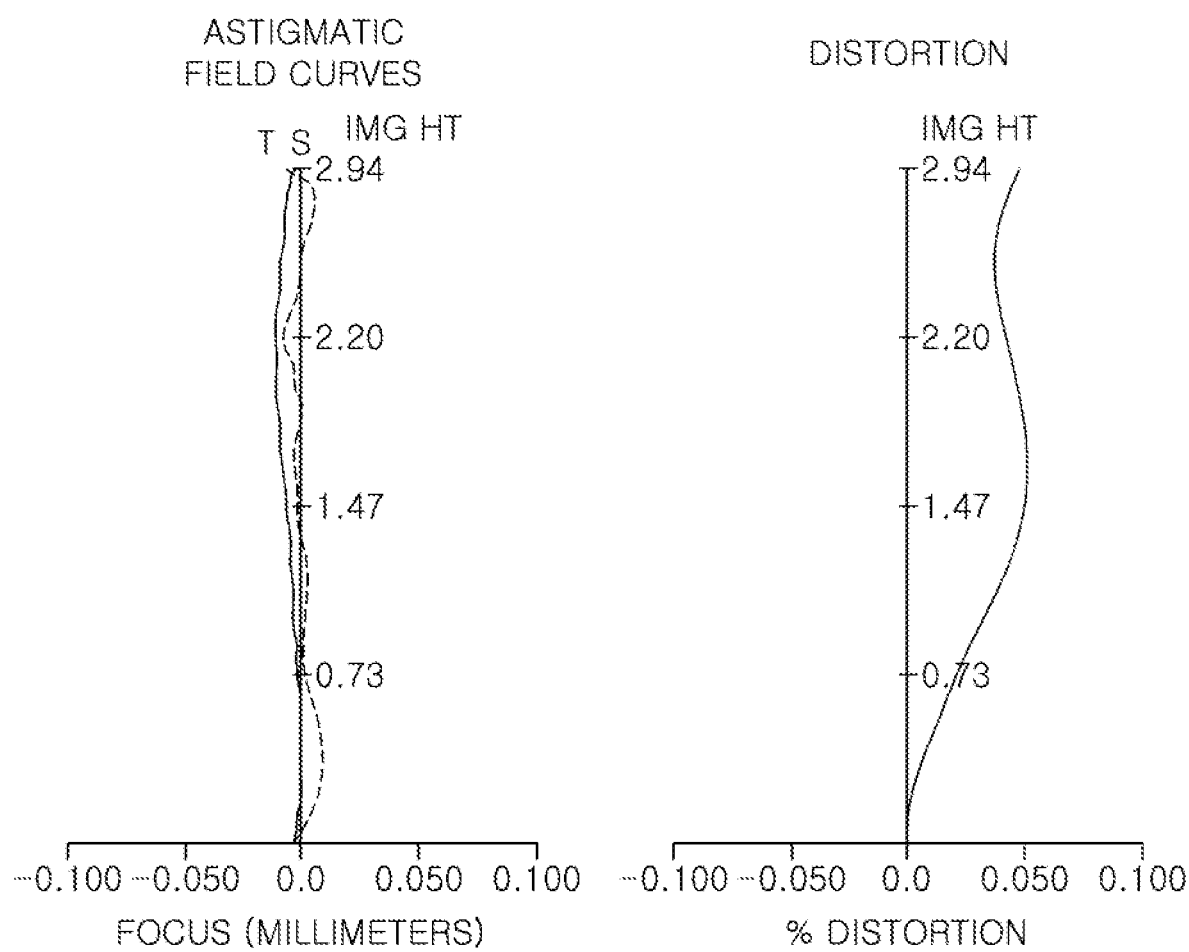
FIG. 10 is curves illustrating aberration characteristics of the lens module illustrated in FIG. 9.

FIG. 10 is a graph illustrating aberration characteristics of the lens module 300 of the third exemplary embodiment.

Characteristics of the optical system configuring the lens module 300 will hereinafter be described with reference to FIG. 11.

In FIG. 11, Surface Nos. 2 and 3 indicate the first and second surfaces of the first lens 310, respectively, and Surface Nos. 4 and 5 indicate the first and second surfaces of the second lens 320, respectively. In a similar scheme, Surface Nos. 7 to 14 indicate first and second surfaces of the third to sixth lenses 330 to 360, respectively. Meanwhile, Surface No. 6 indicates the stop ST, and Surface Nos. 15 and 16 indicate first and second surfaces of the infrared cut-off filter 70, respectively.

Aspherical values of the optical system configuring the lens module 300 of the third exemplary embodiment will hereinafter be described with reference to FIG. 12.

In FIG. 12, a horizontal axis of the table refers to Surface Nos. of the first to sixth lenses 310 to 360, and a vertical axis of the table refers to characteristics corresponding to each lens surface.

Figure 13:
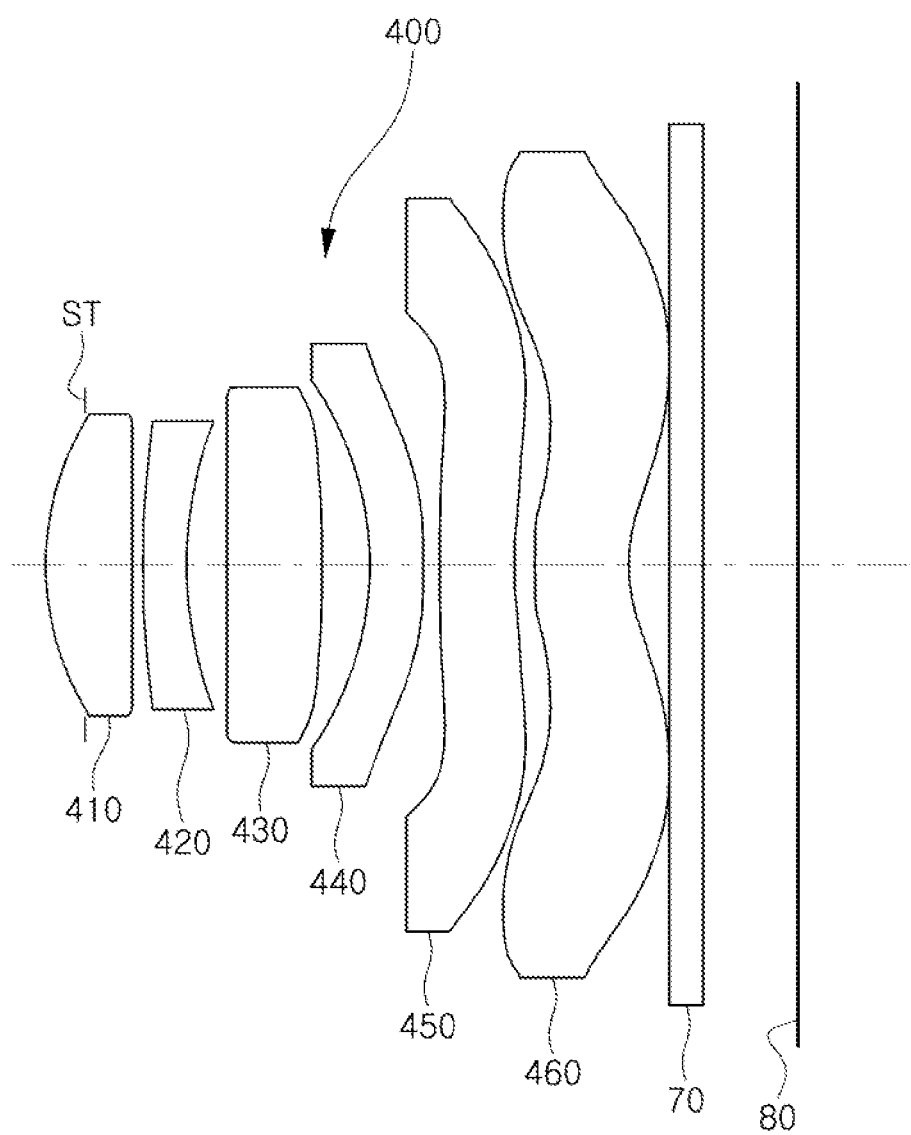
FIG. 13 is a configuration diagram of a lens module according to a fourth exemplary embodiment of the present disclosure.

A lens module according to a fourth exemplary embodiment of the present disclosure will hereinafter be described with reference to FIG. 13.

A lens module 400 may include an optical system including a first lens 410, a second lens 420, a third lens 430, a fourth lens 440, a fifth lens 450, and a sixth lens 460. In addition, the lens module 400 may further include an infrared cut-off filter 70 and an image sensor 80. Further, the lens module 400 may further include at least one stop (ST). For example, the stop ST may be disposed between a subject (object) and the first lens 410. However, the stop ST may be disposed anywhere between the first lens 410 and the sixth lens 460.

In the exemplary embodiment of the present disclosure, the first lens 410 may have positive refractive power. However, the first lens 410 may have negative refractive power. An object-side surface of the first lens 410 may be convex and/or an image-side surface of the first lens 410 may be concave. The second lens 420 may have negative refractive power. However, the second lens 420 may have positive refractive power. An object-side surface of the second lens 420 may be convex and/or an image-side surface of the second lens 420 may be concave. The third lens 430 may have positive refractive power. However, the third lens 430 may have negative refractive power. An object-side surface of the third lens 430 may be convex and/or an image-side surface of the third lens 430 may be convex. The fourth lens 440 may have positive refractive power. However, the fourth lens 440 may have negative refractive power. An object-side surface of the fourth lens 440 may be concave and/or an image-side surface of the fourth lens 440 may be convex. The fifth lens 450 may have negative refractive power. However, the fifth lens 450 may have positive refractive power. The fifth lens 450 may have an object-side surface that is concave and/or an image-side surface that is concave. The sixth lens 460 may have positive refractive power. However, the sixth lens 460 may have negative refractive power. An object-side surface of the sixth lens 460 may be convex and/or an image-side surface of the sixth lens 460 may be concave. In addition, one or more inflection points may be formed on at least one or each of the object-side surface and the image-side surface of the sixth lens 460.

In the exemplary embodiment of the present disclosure, at least one or all of the first lens 410, the third lens 430, the fourth lens 440, and the sixth lens 460 may have positive refractive power. Among these lenses, the first lens 410 may have the strongest refractive power, and the sixth lens 460 may have the weakest refractive power.

In the exemplary embodiment of the present disclosure, one or both of the second lens 420 and the fifth lens 450 may have negative refractive power. Here, the fifth lens 450 may have refractive power stronger than that of the second lens 420.

Figure 14:
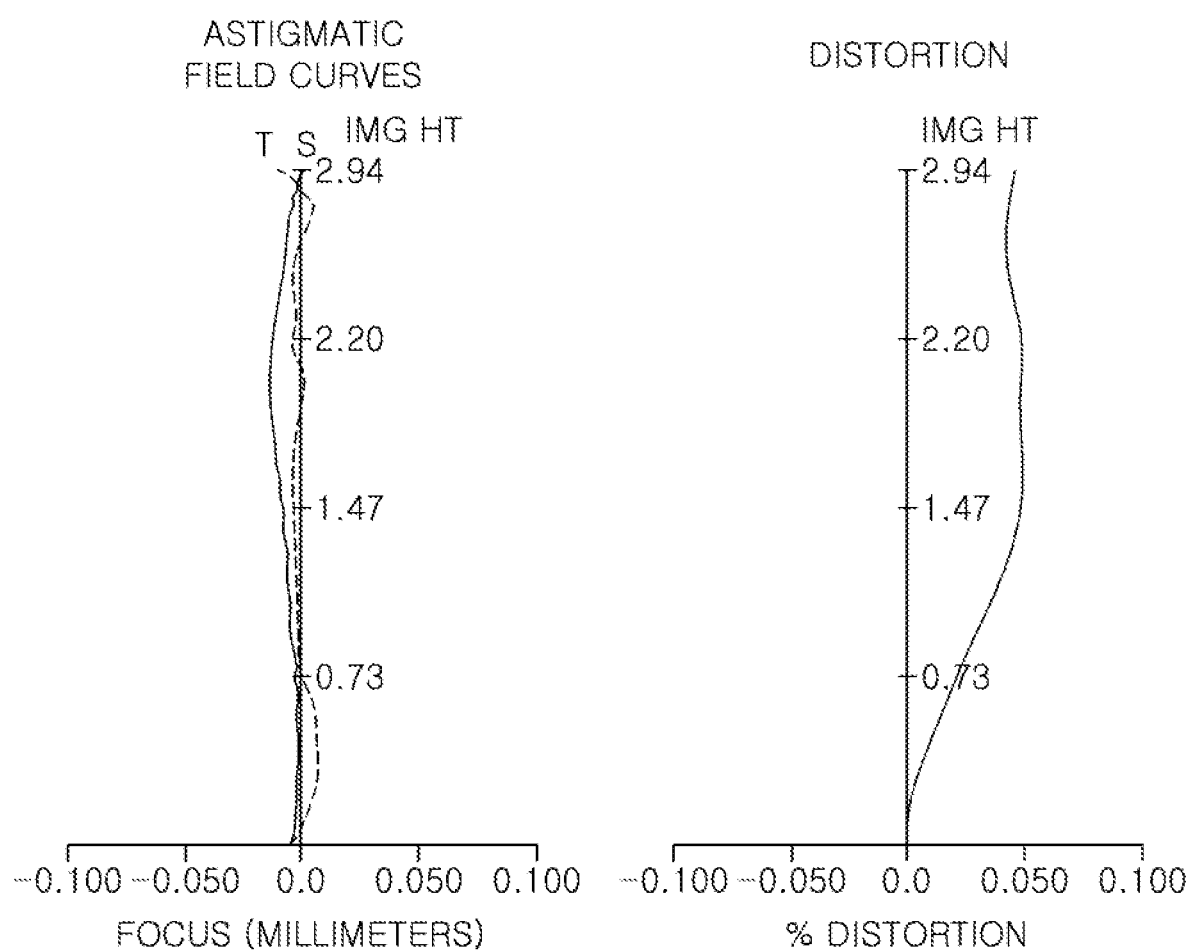
FIG. 14 is curves illustrating aberration characteristics of the lens module illustrated in FIG. 13.

FIG. 14 is a graph illustrating aberration characteristics of the lens module 400 of the fourth exemplary embodiment.

Characteristics of the optical system configuring the lens module 400 will hereinafter be described with reference to FIG. 15.

In FIG. 15, Surface Nos. 2 and 3 indicate the first and second surfaces of the first lens 410, respectively, and Surface Nos. 4 and 5 indicate the first and second surfaces of the second lens 420, respectively. In a similar scheme, Surface Nos. 7 to 14 indicate first and second surfaces of the third to sixth lenses 430 to 460, respectively. Meanwhile, Surface No. 6 indicates the stop ST, and Surface Nos. 15 and 16 indicate first and second surfaces of the infrared cut-off filter 70, respectively.

Aspherical values of the optical system configuring the lens module 400 of the fourth exemplary embodiment will hereinafter be described with reference to FIG. 16.

In FIG. 16, a horizontal axis of the table refers to Surface Nos. of the first to sixth lenses 410 to 460, and a vertical axis of the table refers to characteristics corresponding to each lens surface.

Figure 17:
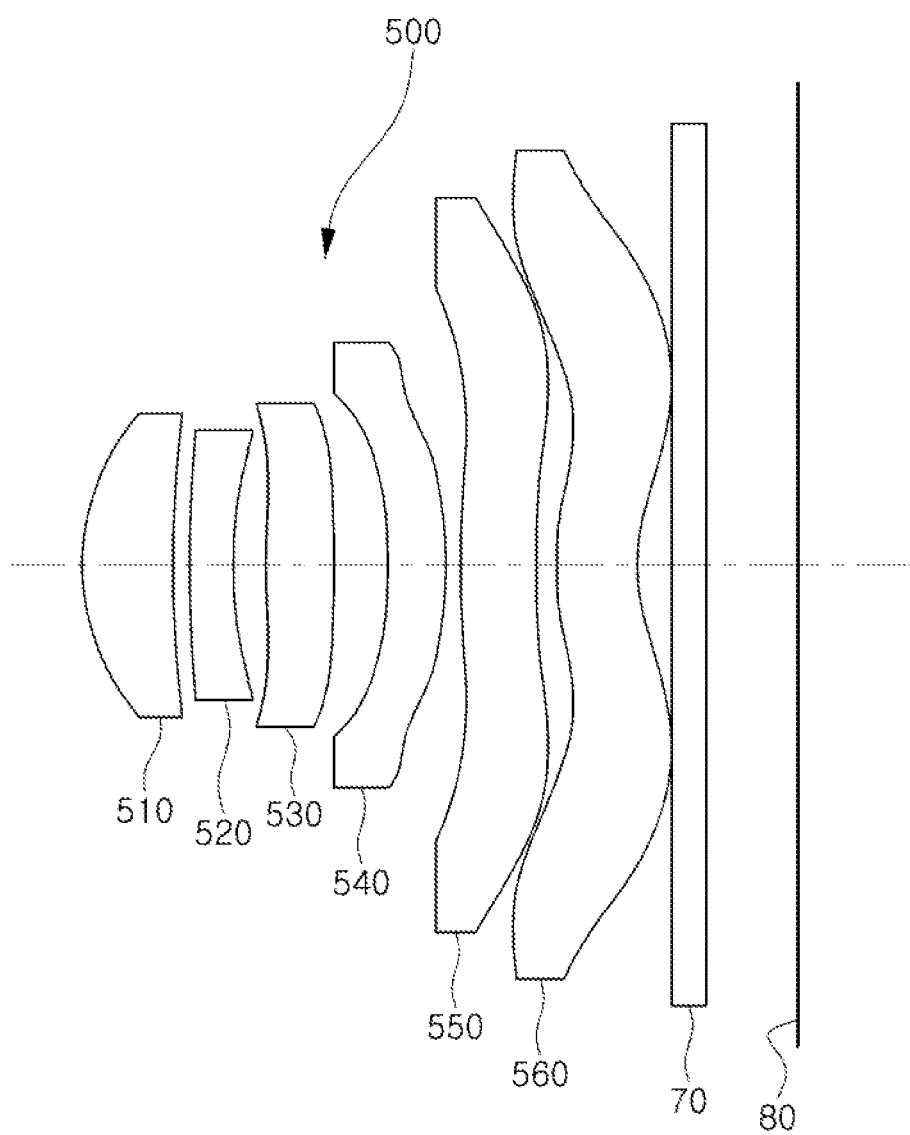
FIG. 17 is a configuration diagram of a lens module according to a fifth exemplary embodiment of the present disclosure.

A lens module according to a fifth exemplary embodiment of the present disclosure will hereinafter be described with reference to FIG. 17.

A lens module 500 may include an optical system including a first lens 510, a second lens 520, a third lens 530, a fourth lens 540, a fifth lens 550, and a sixth lens 560. In addition, the lens module 500 may further include an infrared cut-off filter and an image sensor 80. Further, the lens module 500 may further include a stop (ST). For example, the stop ST may be disposed between a subject (object) and the first lens 510. However, the stop ST may be disposed anywhere between the first lens 510 and the sixth lens 560.

In the exemplary embodiment of the present disclosure, the first lens 510 may have positive refractive power. However, the first lens 510 may have negative refractive power. An object-side surface of the first lens 510 may be convex and/or an image-side surface of the first lens 510 may be concave. The second lens 520 may have negative refractive power. However, the second lens 520 may have positive refractive power. An object-side surface of the second lens 520 may be convex and/or an image-side surface of the second lens 520 may be concave. The third lens 530 may have positive refractive power. However, the third lens 530 may have negative refractive power. An object-side surface of the third lens 530 may be convex and/or an image-side surface of the third lens 530 may be convex. The fourth lens 540 may have positive refractive power. However, the fourth lens 540 may have negative refractive power. An object-side surface of the fourth lens 540 may be concave and/or an image-side surface of the fourth lens 540 may be convex. The fifth lens 550 may have negative refractive power. However, the fifth lens 550 may have positive refractive power. The fifth lens 550 may have an object-side surface that is concave and/or an image-side surface that is concave. The sixth lens 560 may have positive refractive power. However, the sixth lens 560 may have negative refractive power. An object-side surface of the sixth lens 560 may be convex and/or an image-side surface of the sixth lens 560 may be concave. In addition, one or more inflection points may be formed on at least one or each of the object-side surface and the image-side surface of the sixth lens 560.

In the exemplary embodiment of the present disclosure, at least one or all of the first lens 510, the third lens 530, the fourth lens 540, and the sixth lens 560 may have positive refractive power. Among these lenses, the first lens 510 may have the strongest refractive power, and the sixth lens 560 may have the weakest refractive power.

In the exemplary embodiment of the present disclosure, one or both of the second lens 520 and the fifth lens 550 may have negative refractive power. Here, the second lens 520 may have refractive power stronger than that of the fifth lens 550.

Figure 18:
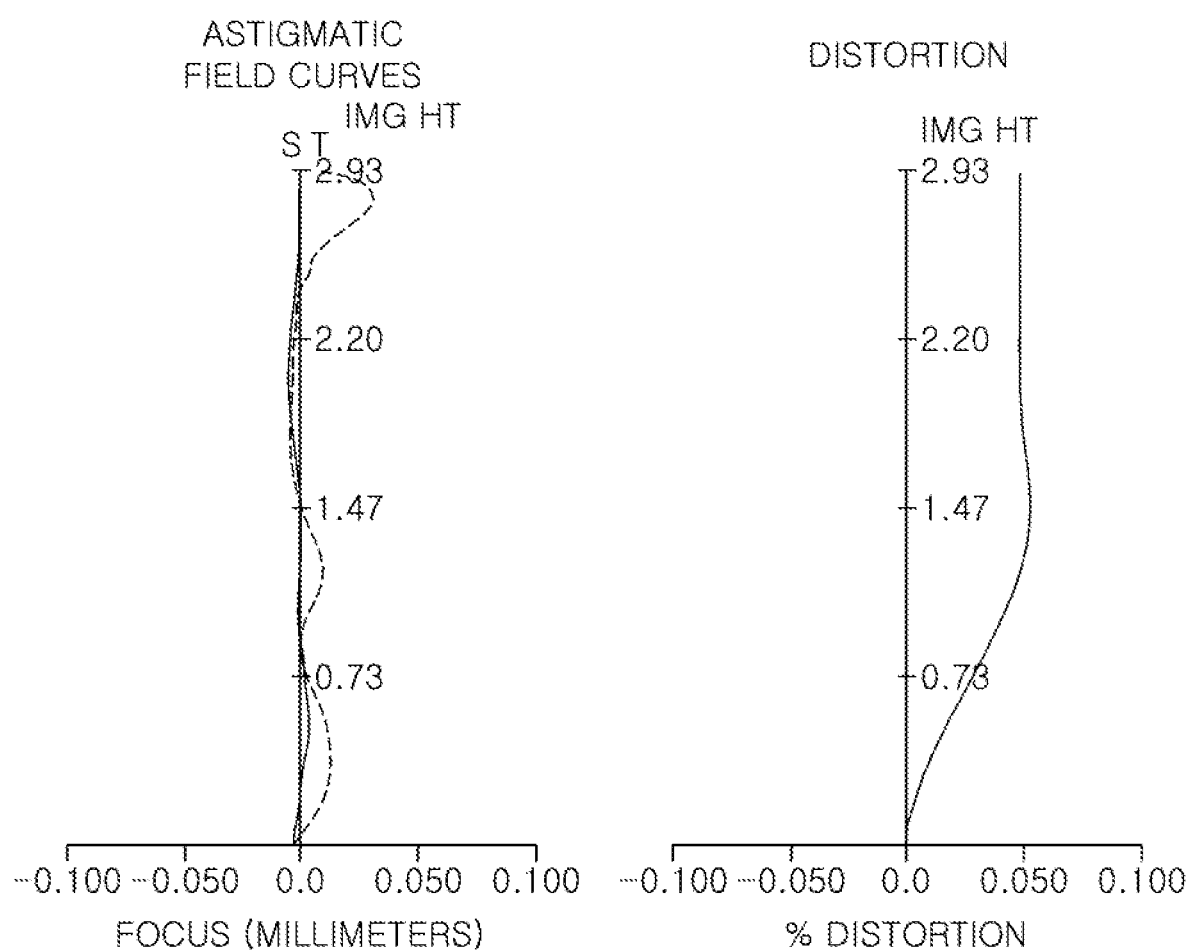
FIG. 18 is curves illustrating aberration characteristics of the lens module illustrated in FIG. 17.

FIG. 18 is a graph illustrating aberration characteristics of the lens module 500 of the fifth exemplary embodiment.

Characteristics of the optical system configuring the lens module 500 will hereinafter be described with reference to FIG. 19.

In FIG. 19, Surface Nos. 2 and 3 indicate the first and second surfaces of the first lens 510, respectively, and Surface Nos. 4 and 5 indicate the first and second surfaces of the second lens 520, respectively. In a similar scheme, Surface Nos. 7 to 14 indicate first and second surfaces of the third to sixth lenses 530 to 560, respectively. Meanwhile, Surface No. 6 indicates the stop ST, and Surface Nos. 15 and 16 indicate first and second surfaces of the infrared cut-off filter 70, respectively.

Aspherical values of the optical system configuring the lens module 500 of the fifth exemplary embodiment will hereinafter be described with reference to FIG.

In FIG. 20, a horizontal axis of the table refers to Surface Nos. of the first to sixth lenses 510 to 560, and a vertical axis of the table refers to characteristics corresponding to each lens surface.

Figure 21:
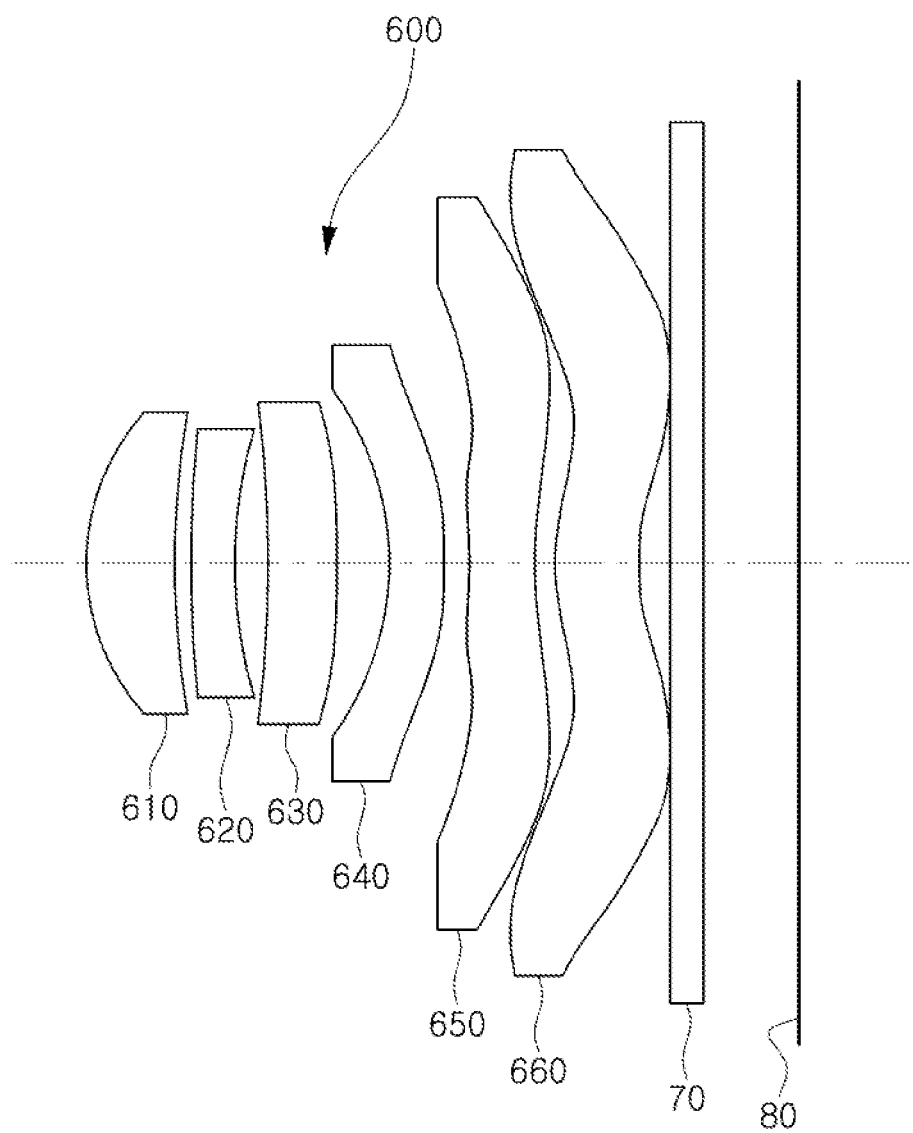
FIG. 21 is a configuration diagram of a lens module according to a sixth exemplary embodiment of the present disclosure.

A lens module according to a sixth exemplary embodiment of the present disclosure will hereinafter be described with reference to FIG. 21.

A lens module 600 may include an optical system including a first lens 610, a second lens 620, a third lens 630, a fourth lens 640, a fifth lens 650, and a sixth lens 660. In addition, the lens module 600 may further include an infrared cut-off filter and an image sensor 80. Further, the lens module 600 may further include at least one stop (ST). For example, the stop ST may be disposed between a subject (object) and the first lens 610. However, the stop ST may be disposed anywhere between the first lens 610 and the sixth lens 660.

In the exemplary embodiment of the present disclosure, the first lens 610 may have positive refractive power. However, the first lens 610 may have negative refractive power. An object-side surface of the first lens 610 may be convex and/or an image-side surface of the first lens 610 may be concave. The second lens 620 may have negative refractive power. However, the second lens 620 may have positive refractive power. An object-side surface of the second lens 620 may be convex and/or an image-side surface of the second lens 620 may be concave. The third lens 630 may have positive refractive power. However, the third lens 630 may have negative refractive power. An object-side surface of the third lens 630 may be convex and/or an image-side surface of the third lens 630 may be convex. The fourth lens 640 may have positive refractive power. However, the fourth lens 640 may have negative refractive power. An object-side surface of the fourth lens 640 may be concave and/or an image-side surface of the fourth lens 640 may be convex. The fifth lens 650 may have negative refractive power. However, the fifth lens 650 may have positive refractive power. The fifth lens 650 may have an object-side surface that is concave and/or an image-side surface that is concave. The sixth lens 660 may have positive refractive power. However, the sixth lens 660 may have negative refractive power. An object-side surface of the sixth lens 660 may be convex and/or an image-side surface of the sixth lens 660 may be concave. In addition, one or more inflection points may be formed on at least one or each of the object-side surface and the image-side surface of the sixth lens 660.

In the exemplary embodiment of the present disclosure, at least one or all of the first lens 610, the third lens 630, the fourth lens 640, and the sixth lens 660 may have positive refractive power. Among these lenses, the first lens 610 may have the strongest refractive power, and the sixth lens 660 may have the weakest refractive power.

In the exemplary embodiment of the present disclosure, one or both of the second lens 620 and the fifth lens 650 may have negative refractive power. Here, the second lens 620 may have refractive power stronger than that of the fifth lens 650.

Figure 22:
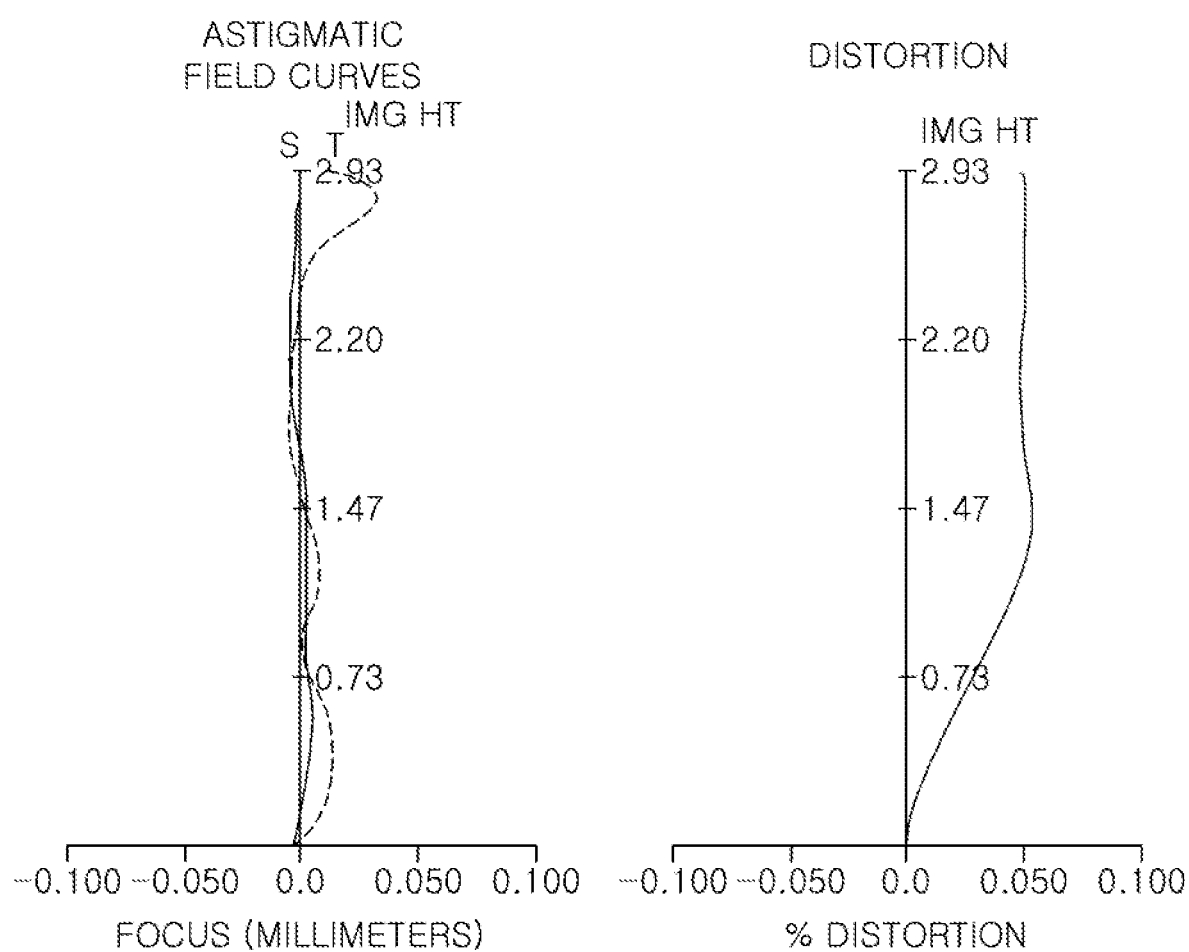
FIG. 22 is curves illustrating aberration characteristics of the lens module illustrated in FIG. 21.

FIG. 22 is a graph illustrating aberration characteristics of the lens module 600 of the sixth exemplary embodiment.

Characteristics of the optical system configuring the lens module 600 will hereinafter be described with reference to FIG. 23.

In FIG. 23, Surface Nos. 2 and 3 indicate the first and second surfaces of the first lens 610, respectively, and Surface Nos. 4 and 5 indicate the first and second surfaces of the second lens 620, respectively. In a similar scheme, Surface Nos. 7 to 14 indicate first and second surfaces of the third to sixth lenses 630 to 660, respectively. Meanwhile, Surface No. 6 indicates the stop ST, and Surface Nos. 15 and 16 indicate first and second surfaces of the infrared cut-off filter 70, respectively.

Aspherical values of the optical system configuring the lens module 600 of the sixth exemplary embodiment will hereinafter be described with reference to FIG. 24.

In FIG. 24, a horizontal axis of the table refers to Surface Nos. of the first to sixth lenses 610 to 660, and a vertical axis of the table refers to characteristics corresponding to each lens surface.

Figure 25:
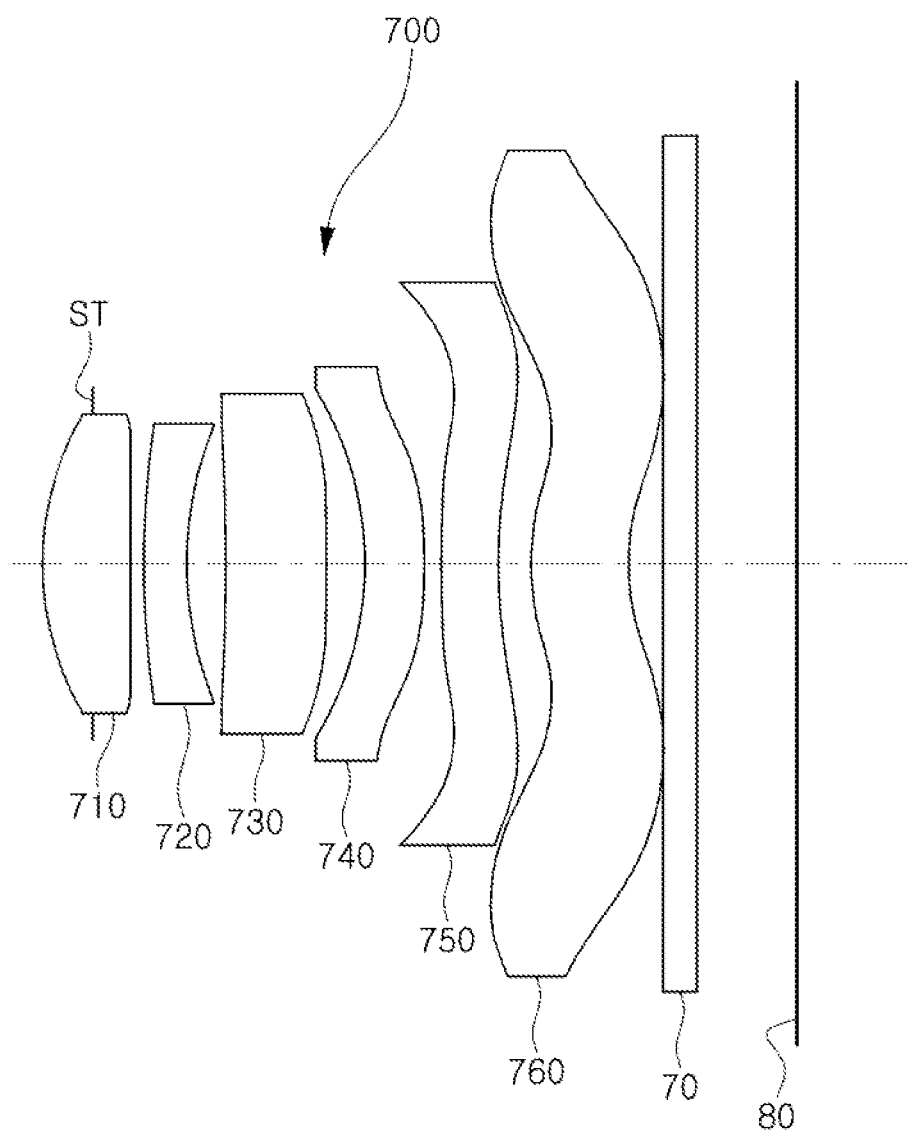
FIG. 25 is a configuration diagram of a lens module according to a seventh exemplary embodiment of the present disclosure.

A lens module according to a seventh exemplary embodiment of the present disclosure will hereinafter be described with reference to FIG. 25.

A lens module 700 may include an optical system including a first lens 710, a second lens 720, a third lens 730, a fourth lens 740, a fifth lens 750, and a sixth lens 760. In addition, the lens module 700 may further include an infrared cut-off filter and an image sensor 80. Further, the lens module 700 may further include at least one stop (ST). For example, the stop ST may be disposed between a subject (object) and the first lens 710. However, the stop ST may be disposed anywhere between the first lens 710 and the sixth lens 760.

In the exemplary embodiment of the present disclosure, the first lens 710 may have positive refractive power. However, the first lens 710 may have negative refractive power. An object-side surface of the first lens 710 may be convex and/or an image-side surface of the first lens 710 may be concave. The second lens 720 may have negative refractive power. However, the second lens 720 may have positive refractive power. An object-side surface of the second lens 720 may be convex and/or an image-side surface of the second lens 720 may be concave. The third lens 730 may have positive refractive power. However, the third lens 730 may have negative refractive power. An object-side surface of the third lens 730 may be convex and/or an image-side surface of the third lens 730 may be convex. The fourth lens 740 may have positive refractive power. However, the fourth lens 740 may have negative refractive power. An object-side surface of the fourth lens 740 may be concave and/or an image-side surface of the fourth lens 740 may be convex. The fifth lens 750 may have negative refractive power. However, the fifth lens 750 may have positive refractive power. An object-side surface of the fifth lens 750 may be convex and/or an image-side surface of the fifth lens 750 may be concave. The sixth lens 760 may have positive refractive power. However, the sixth lens 760 may have negative refractive power. An object-side surface of the sixth lens 760 may be convex and/or an image-side surface of the sixth lens 760 may be concave. In addition, one or more inflection points may be formed on at least one or each of the object-side surface and the image-side surface of the sixth lens 760.

In the exemplary embodiment of the present disclosure, at least one or all of the first lens 710, the third lens 730, the fourth lens 740, and the sixth lens 760 may have positive refractive power. Among these lenses, the first lens 710 may have the strongest refractive power, and the sixth lens 760 may have the weakest refractive power.

In the exemplary embodiment of the present disclosure, one or both of the second lens 720 and the fifth lens 750 may have negative refractive power. Here, the fifth lens 750 may have refractive power stronger than that of the second lens 720.

Figure 26:
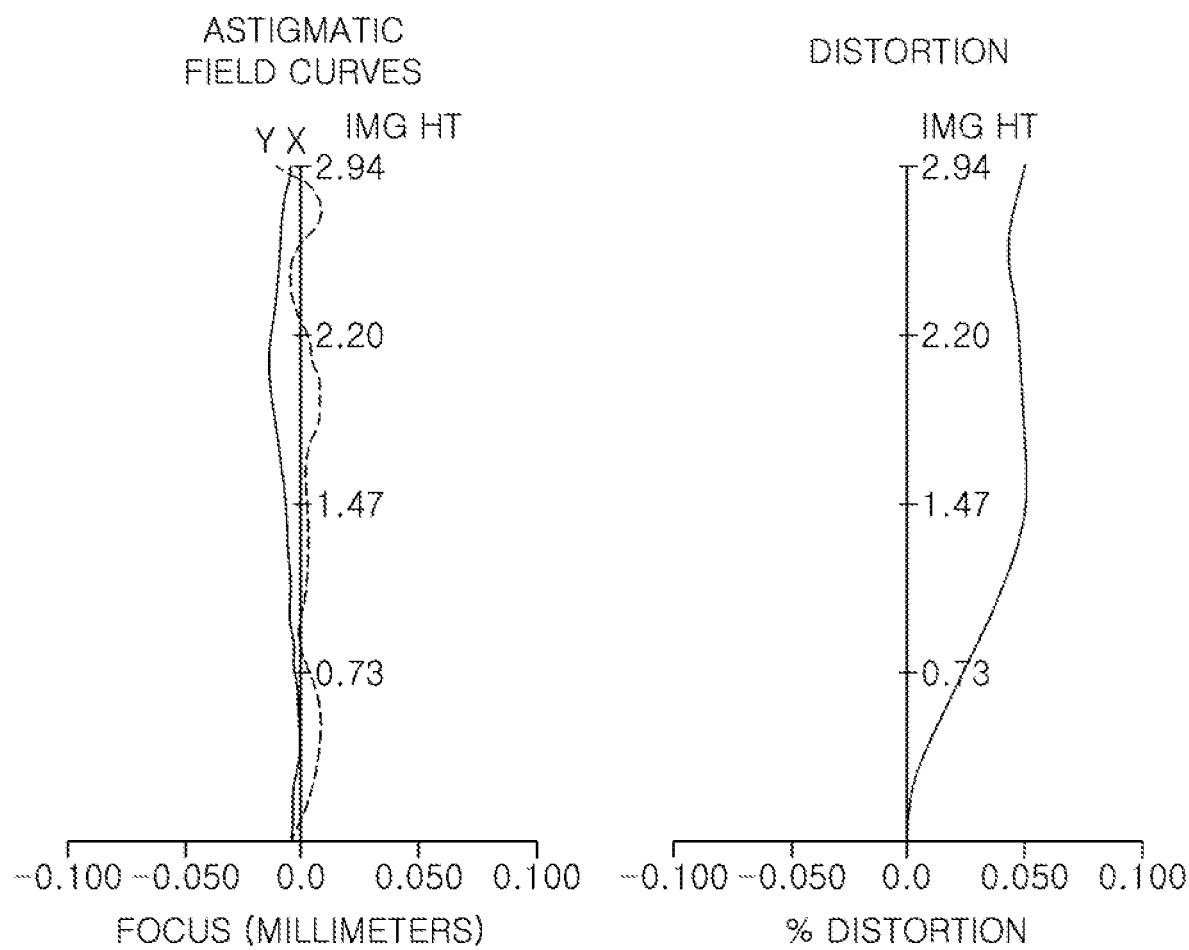
FIG. 26 is curves illustrating aberration characteristics of the lens module illustrated in FIG. 25.

FIG. 26 is a graph illustrating aberration characteristics of the lens module 700 of the seventh exemplary embodiment.

Characteristics of the optical system configuring the lens module 700 will hereinafter be described with reference to FIG. 27.

In FIG. 27, Surface Nos. 2 and 3 indicate the first and second surfaces of the first lens 710, respectively, and Surface Nos. 4 and 5 indicate the first and second surfaces of the second lens 720, respectively. In a similar scheme, Surface Nos. 7 to 14 indicate first and second surfaces of the third to sixth lenses 730 to 760, respectively. Meanwhile, Surface No. 6 indicates the stop ST, and Surface Nos. 15 and 16 indicate first and second surfaces of the infrared cut-off filter 70, respectively.

Aspherical values of the optical system configuring the lens module 700 of the seventh exemplary embodiment will hereinafter be described with reference to FIG. 28.

In FIG. 28, a horizontal axis of the table refers to Surface Nos. of the first to sixth lenses 710 to 760, and a vertical axis of the table refers to characteristics corresponding to each lens surface.

Figure 29:
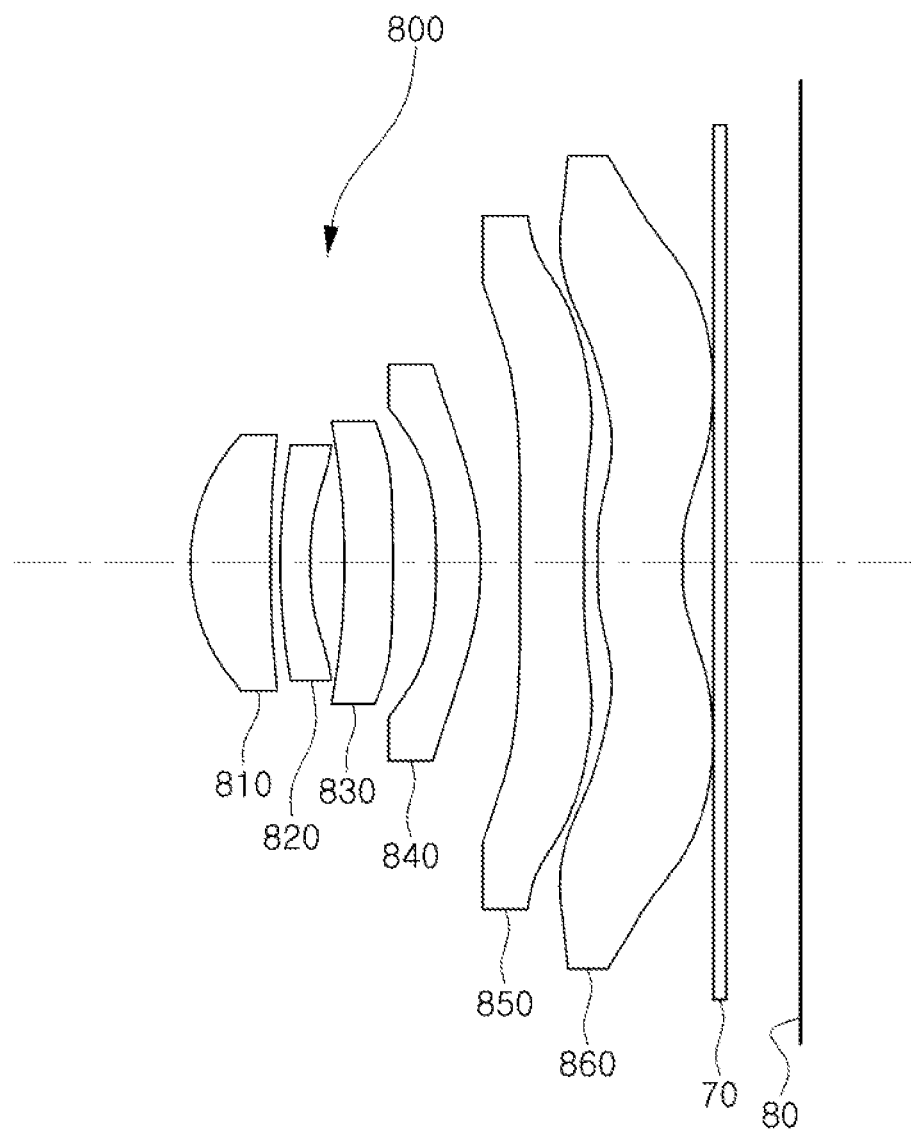
FIG. 29 is a configuration diagram of a lens module according to an eighth exemplary embodiment of the present disclosure.

A lens module according to an eighth exemplary embodiment of the present disclosure will hereinafter be described with reference to FIG. 29.

A lens module 800 may include an optical system including a first lens 810, a second lens 820, a third lens 830, a fourth lens 840, a fifth lens 850, and a sixth lens 860. In addition, the lens module 800 may further include an infrared cut-off filter and an image sensor 80. Further, the lens module 800 may further include at least one stop (ST). For example, the stop ST may be disposed between a subject (object) and the first lens 810. However, the stop ST may be disposed anywhere between the first lens 810 and the sixth lens 860.

In the exemplary embodiment of the present disclosure, the first lens 810 may have positive refractive power. However, the first lens 810 may have negative refractive power. An object-side surface of the first lens 810 may be convex and/or an image-side surface of the first lens 810 may be concave. The second lens 820 may have negative refractive power. However, the second lens 820 may have positive refractive power. An object-side surface of the second lens 820 may be convex and/or an image-side surface of the second lens 820 may be concave. The third lens 830 may have positive refractive power. However, the third lens 830 may have negative refractive power. An object-side surface of the third lens 830 may be convex and/or an image-side surface of the third lens 830 may be convex. The fourth lens 840 may have positive refractive power. However, the fourth lens 840 may have negative refractive power. An object-side surface of the fourth lens 840 may be concave and/or an image-side surface of the fourth lens 840 may be convex. The fifth lens 850 may have negative refractive power. However, the fifth lens 850 may have positive refractive power. The fifth lens 850 may have an object-side surface that is concave and/or an image-side surface that is concave. The sixth lens 860 may have positive refractive power. However, the sixth lens 860 may have negative refractive power. An object-side surface of the sixth lens 860 may be convex and/or an image-side surface of the sixth lens 860 may be concave. In addition, one or more inflection points may be formed on at least one or each of the object-side surface and the image-side surface of the sixth lens 860.

In the exemplary embodiment of the present disclosure, at least one or all of the first lens 810, the third lens 830, the fourth lens 840, and the sixth lens 860 may have positive refractive power. Among these lenses, the first lens 810 may have the strongest refractive power, and the sixth lens 860 may have the weakest refractive power.

In the exemplary embodiment of the present disclosure, one or both of the second lens 820 and the fifth lens 850 may have negative refractive power. Here, the second lens 820 may have refractive power stronger than that of the fifth lens 850.

Figure 30:
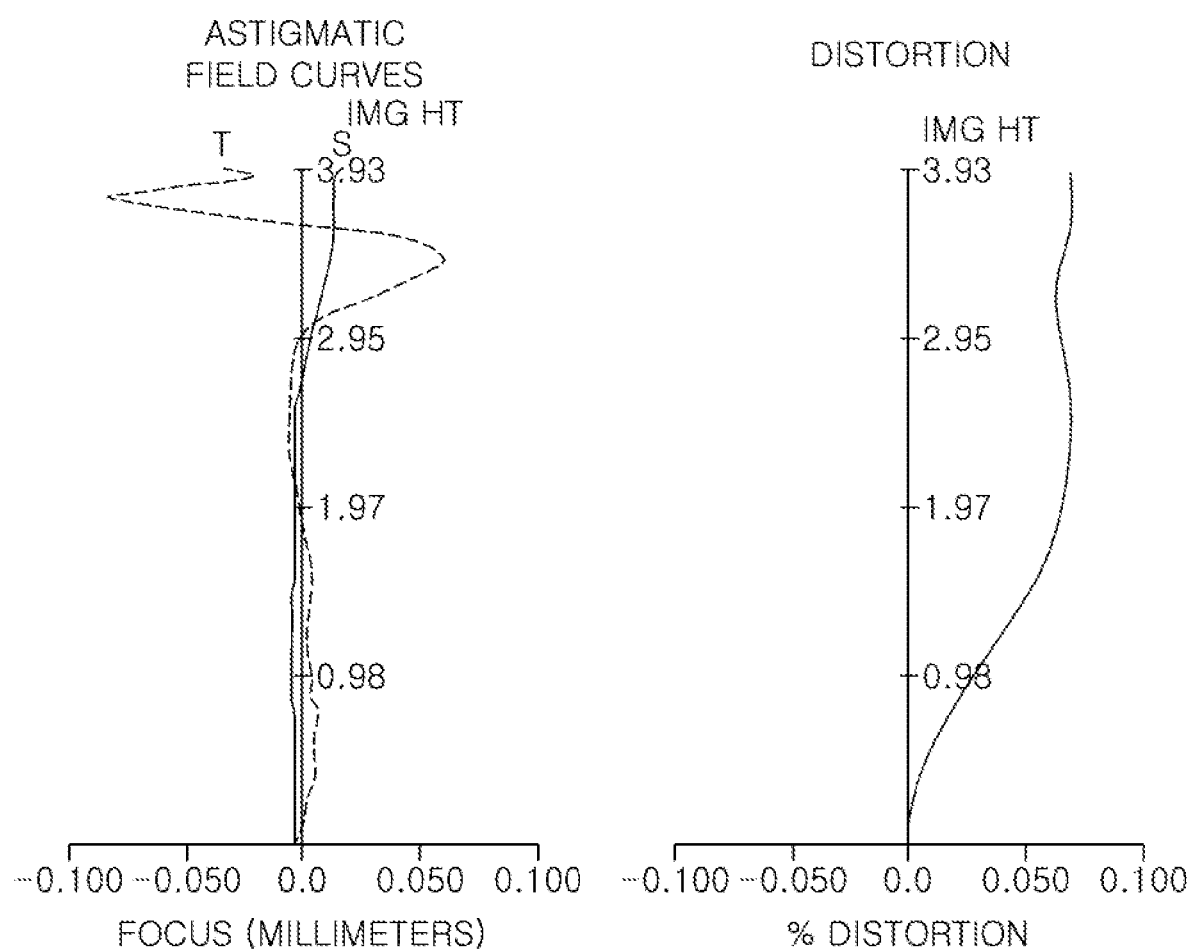
FIG. 30 is curves illustrating aberration characteristics of the lens module illustrated in FIG. 29.

FIG. 30 is a graph illustrating aberration characteristics of the lens module 800 of the eighth exemplary embodiment.

Characteristics of the optical system configuring the lens module 800 will hereinafter be described with reference to FIG. 31.

In FIG. 31, Surface Nos. 2 and 3 indicate the first and second surfaces of the first lens 810, respectively, and Surface Nos. 4 and 5 indicate the first and second surfaces of the second lens 820, respectively. In a similar scheme, Surface Nos. 7 to 14 indicate first and second surfaces of the third to sixth lenses 830 to 860, respectively. Meanwhile, Surface No. 6 indicates the stop ST, and Surface Nos. 15 and 16 indicate first and second surfaces of the infrared cut-off filter 70, respectively.

Aspherical values of the optical system configuring the lens module 800 of the eighth exemplary embodiment will hereinafter be described with reference to FIG. 32.

In FIG. 32, a horizontal axis of the table refers to Surface Nos. of the first to sixth lenses 810 to 860, and a vertical axis of the table refers to characteristics corresponding to each lens surface.

Table 1 (shown below) shows optical characteristics of the lens modules according to the first to eighth exemplary embodiments in the present disclosure. The lens module may substantially have an overall focal length (f) of 3.70 to 4.60. In the lens module, a focal length (f1) of the first lens may be substantially within a range of 3.0 to 4.0. In the lens module, a focal length (f2) of the second lens may be substantially within a range of −10.0 to −5.0. In the lens module, a focal length (f3) of the third lens may be substantially within a range of 11.0 to 19.0. In the lens module, a focal length (f4) of the fourth lens may be substantially within a range of 19.0 to 24.0. In the lens module, a focal length (f5) of the fifth lens may be substantially within a range of −12.0 to −6.0. In the lens module, a focal length (f6) of the sixth lens may be substantially 90.0 or more. In the lens module, a synthetic focal length (f12) of the first and second lenses may be substantially within a range of 3.9 to 5.9. In the lens module, a radius (EPD/2) of an entrance pupil having an entrance pupil diameter (EPD) may be substantially within a range of 0.85 to 1.15. In the lens module, an overall length of the optical system may be substantially within a range of 4.3 to 5.4. In the lens module, BFL may be substantially within a range of 0.90 to 1.05. In the lens module, a field of view (FOV) of the lens module may be substantially in a range of 72.0 to 84.0. In addition, F No. of the lens module may be substantially in a range of 1.90 to 2.10.

TABLE 1

|     | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment | Eighth Exemplary Embodiment |
|-----|---|---|---|---|---|---|---|---|
| f   | 3.735 | 3.735 | 3.735 | 3.735 | 3.730 | 3.730 | 3.730 | 4.450 |
| f1  | 3.003 | 3.036 | 3.012 | 3.021 | 3.264 | 3.263 | 3.038 | 3.851 |
| f2  | −5.536 | −5.703 | −5.538 | −5.581 | −8.566 | −8.572 | −5.421 | −9.795 |
| f3  | 12.741 | 12.452 | 13.088 | 12.780 | 12.030 | 12.023 | 11.879 | 17.961 |
| f4  | 21.922 | 20.419 | 20.197 | 19.996 | 22.478 | 19.761 | 22.279 | 20.699 |
| f5  | −10.640 | −9.557 | −10.772 | −10.136 | −7.038 | −6.587 | −11.062 | −8.577 |
| f6  | 491.36 | 91.13 | 5199.46 | 184.99 | 108.91 | 98.26 | 99.46 | 2605.30 |
| f12 | 5.086 | 5.080 | 5.122 | 5.132 | 4.458 | 4.454 | 5.290 | 5.382 |

TABLE 1-continued

|  | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment | Eighth Exemplary Embodiment |
|---|---|---|---|---|---|---|---|---|
| EPD/2 | 0.900 | 0.900 | 0.900 | 0.900 | 0.900 | 0.900 | 0.900 | 1.070 |
| OAL | 4.684 | 4.687 | 4.692 | 4.687 | 4.449 | 4.435 | 4.701 | 5.261 |
| BFL | 1.023 | 1.034 | 1.024 | 1.036 | 0.991 | 0.983 | 1.044 | 1.008 |
| FOV | 74.90 | 75.10 | 75.00 | 75.00 | 75.00 | 75.00 | 75.00 | 81.10 |
| F. No. | 2.070 | 2.070 | 2.080 | 2.070 | 2.070 | 2.070 | 1.990 | 2.080 |

Table 2 (shown below) shows numerical ranges of Conditional Expressions and values of Conditional Expressions of the lens modules according to the first to eighth exemplary embodiments in the present disclosure.

TABLE 2

|  | Conditional Expression |  |  |  | First Exemplary Embodiment | Second Exemplary Embodiment | Third Exemplary Embodiment | Fourth Exemplary Embodiment | Fifth Exemplary Embodiment | Sixth Exemplary Embodiment | Seventh Exemplary Embodiment | Eighth Exemplary Embodiment |
|---|---|---|---|---|---|---|---|---|---|---|---|---|
| 1 | 0.5 | < | f1/f | < 0.9 | 0.804 | 0.813 | 0.806 | 0.809 | 0.875 | 0.875 | 0.814 | 0.865 |
| 2 | 20 | < | V1-V2 | < 45 | 34.6 | 34.6 | 34.6 | 34.6 | 34.6 | 34.6 | 34.6 | 32.8 |
| 3 |  |  | |v1-v3| | < 15 | 0.0 | 0.0 | 0.0 | 0.0 | 0.0 | 0.0 | 0.0 | 0.0 |
| 4 | 25 | < | v1-v5 | < 45 | 34.6 | 34.6 | 34.6 | 34.6 | 34.6 | 34.6 | 34.6 | 32.8 |
| 5 | -5.0 | < | f2/f | < 0.0 | -1.482 | -1.527 | -1.483 | -1.494 | -2.296 | -2.298 | -1.453 | -2.201 |
| 6 | 0.0 | < | f3/f | < 6.0 | 3.411 | 3.334 | 3.504 | 3.422 | 3.225 | 3.223 | 3.185 | 4.036 |
| 7 | 2.0 | < | f4/f |  | 5.869 | 5.467 | 5.407 | 5.354 | 6.026 | 5.298 | 5.973 | 4.651 |
| 8 |  |  | f5/f | < -1.0 | -2.849 | -2.559 | -2.884 | -2.714 | -3.887 | -1.766 | -2.966 | -1.927 |
| 9 |  |  | OAL/f | < 1.5 | 1.254 | 1.255 | 1.256 | 1.255 | 1.193 | 1.189 | 1.260 | 1.182 |
| 10 | -1.0 | < | f1/f2 | < 0.0 | -0.542 | -0.532 | -0.544 | -0.541 | -0.381 | -0.381 | -0.560 | -0.393 |
| 11 | -1.0 | < | f2/f3 | < 0.0 | -0.434 | -0.458 | -0.423 | -0.437 | -0.712 | -0.713 | -0.456 | -0.545 |
| 12 |  |  | BFL/f | < 0.5 | 0.274 | 0.277 | 0.274 | 0.277 | 0.266 | 0.263 | 0.280 | 0.226 |
| 13 |  |  | D3/f | < 0.1 | 0.014 | 0.014 | 0.015 | 0.016 | 0.026 | 0.025 | 0.027 | 0.025 |
| 14 | 0.0 | < | r3/f | < 10.0 | 8.275 | 6.319 | 7.538 | 7.047 | 1.248 | 1.238 | 9.249 | 1.175 |
| 15 | 0.0 | < | r11/f | < 5.0 | 2.017 | 1.798 | 2.044 | 2.066 | 1.435 | 1.409 | 1.193 | 1.674 |
| 16 | 1.0 | < | EPD/2/f12 |  | 1.360 | 1.360 | 1.370 | 1.370 | 1.200 | 1.190 | 1.420 | 1.210 |

As seen in Table 2, the lens modules according to the first to eighth exemplary embodiments in the present disclosure may satisfy at least one or all of the Conditional Expressions. Meanwhile, the lens modules according to the first to eighth exemplary embodiments in the present disclosure may have values of 1.163, 1.144, 1.165, 1.365, 1.366, 1.532, 0.454, and 1.909, respectively, with respect to Conditional Expression: (r10−r11)/(r10+r11) for a shape of the fifth lens.

As set forth above, according to some exemplary embodiments in the present disclosure, an optical system having high resolution may be implemented.

While exemplary embodiments have been shown and described above, it will be apparent to those skilled in the art that modifications and variations could be made without departing from the scope of the present invention as defined by the appended claims.

What is claimed is:

1. A lens module, comprising:
a first lens having a refractive power;
a second lens having a convex object-side surface;
a third lens having a convex object-side surface;
a fourth lens having a refractive power;
a fifth lens having a refractive power; and
a sixth lens having a refractive power,
wherein the first to sixth lenses are sequentially disposed from an object side to an imaging plane,
wherein a thickness along an optical axis of the third lens is greater than a thickness along an optical axis of the fourth lens, and
wherein $20 < V1 - V2 < 45$, where V1 is an Abbe number of the first lens and V2 is an Abbe number of the second lens.

2. The lens module of claim 1, wherein the first lens has a convex object-side surface.

3. The lens module of claim 1, wherein the fourth lens has a concave object-side surface.

4. The lens module of claim 1, wherein the fifth lens has a concave object-side surface.

5. The lens module of claim 1, wherein the sixth lens has a convex object-side surface.

6. The lens module of claim 1, wherein $0 < f3/f < 6.0$, where f is an overall focal length of the lens module and f3 is a focal length of the third lens.

7. The lens module of claim 1, wherein $-1.0 < f1/f2 < 0.0$, where f1 is a focal length of the first lens and f2 is a focal length of the second lens.

8. A lens module, comprising:
a first lens having a concave image-side surface;
a second lens having a refractive power;
a third lens having a convex object-side surface;
a fourth lens having a refractive power;
a fifth lens having a refractive power; and
a sixth lens having a refractive power,
wherein the first to sixth lenses are sequentially disposed from an object side to an imaging plane, wherein a thickness along an optical axis of the third lens is greater than a thickness along an optical axis of the fourth lens, and wherein $20<V1-V2<45$, where V1 is an Abbe number of the first lens and V2 is an Abbe number of the second lens.

9. The lens module of claim 8, wherein the first lens has a convex object-side surface.

10. The lens module of claim 8, wherein the fourth lens has a concave object-side surface.

11. The lens module of claim 8, wherein the fifth lens has a concave object-side surface.

12. The lens module of claim 8, wherein the sixth lens has a convex object-side surface.

13. The lens module of claim 8, wherein $0 \leq f3/f < 6.0$, where f is an overall focal length of the lens module and f3 is a focal length of the third lens.

14. The lens module of claim 8, wherein $-1.0 < f1/f2 < 0.0$, where f1 is a focal length of the first lens and f2 is a focal length of the second lens.

* * * * *